US010438147B2

(12) United States Patent
Mindrum et al.

(10) Patent No.: US 10,438,147 B2
(45) Date of Patent: Oct. 8, 2019

(54) DEATH CARE MANAGEMENT SYSTEM AND METHOD

(71) Applicant: CRaKN, L.L.C., Cincinnati, OH (US)

(72) Inventors: G. Scott Mindrum, Cincinnati, OH (US); Clifford Campbell, Loveland, OH (US)

(73) Assignee: CRAKN, LLC, Cincinnati, OH (US)

( * ) Notice: Subject to any disclaimer, the term of this patent is extended or adjusted under 35 U.S.C. 154(b) by 440 days.

(21) Appl. No.: 15/079,189

(22) Filed: Mar. 24, 2016

(65) Prior Publication Data
US 2016/0283877 A1    Sep. 29, 2016

Related U.S. Application Data

(60) Provisional application No. 62/138,656, filed on Mar. 26, 2015.

(51) Int. Cl.
*G06Q 10/00* (2012.01)
*G06Q 10/06* (2012.01)

(52) U.S. Cl.
CPC ........ *G06Q 10/06311* (2013.01); *Y02P 90/86* (2015.11)

(58) Field of Classification Search
None
See application file for complete search history.

(56) References Cited

U.S. PATENT DOCUMENTS

| 7,552,070 B2 * | 6/2009 | Torres | G06Q 10/06311 705/7.13 |
| 2001/0032093 A1 * | 10/2001 | Segal | G06Q 10/10 705/312 |
| 2002/0046046 A1 * | 4/2002 | Barrott | G06Q 30/02 705/26.1 |
| 2002/0111946 A1 * | 8/2002 | Fallon | G06Q 10/10 |
| 2002/0128844 A1 * | 9/2002 | Wilson | G06F 21/64 704/270 |
| 2007/0094661 A1 * | 4/2007 | Baird | G06Q 10/06 718/102 |
| 2007/0095887 A1 * | 5/2007 | Barbosa | G06Q 10/06 235/375 |
| 2008/0072406 A1 * | 3/2008 | Sinclair | G06Q 30/02 27/1 |
| 2008/0086314 A1 * | 4/2008 | Fitzpatrick | G06Q 40/08 705/4 |
| 2008/0163342 A1 * | 7/2008 | Christopherson | G06F 21/125 726/4 |
| 2008/0201924 A2 * | 8/2008 | Sinclair | G06Q 30/02 27/1 |
| 2008/0255988 A1 * | 10/2008 | Maltese | G06Q 10/10 705/39 |
| 2013/0067705 A1 * | 3/2013 | Williamson | A61G 17/02 27/14 |

(Continued)

OTHER PUBLICATIONS

Nobel, Justin, Five Awesome Funeral Apps, Digital Dying, Sep. 13, 2013, p. 1-12.*

*Primary Examiner* — Eric W Stamber
*Assistant Examiner* — Joseph M Waesco
(74) *Attorney, Agent, or Firm* — Forst Brown Todd LLC

(57) ABSTRACT

A system that provides automated and semi-automated tools and methods that may be used by providers in the death care industry to manage time sensitive tasks and share information with third party providers of goods and services.

17 Claims, 21 Drawing Sheets

(56) References Cited

U.S. PATENT DOCUMENTS

| | | | | |
|---|---|---|---|---|
| 2014/0136996 | A1* | 5/2014 | Boozer | G06Q 10/00 |
| | | | | 715/753 |
| 2014/0249877 | A1* | 9/2014 | Hull | G06Q 10/063114 |
| | | | | 705/7.15 |
| 2014/0297348 | A1* | 10/2014 | Ellis | G06Q 10/063114 |
| | | | | 705/7.15 |
| 2014/0337449 | A1* | 11/2014 | Dold | G06Q 10/10 |
| | | | | 709/206 |
| 2015/0161272 | A1* | 6/2015 | Broerse | G06F 16/48 |
| | | | | 707/722 |
| 2015/0264181 | A1* | 9/2015 | Czachor, Jr. | H04M 3/51 |
| | | | | 379/265.13 |
| 2016/0105768 | A1* | 4/2016 | Pinard | H04W 4/21 |
| | | | | 455/457 |
| 2016/0307144 | A1* | 10/2016 | Barbosa | G06Q 10/06 |
| 2016/0378245 | A1* | 12/2016 | Montgomery | G06F 3/1423 |
| | | | | 345/173 |
| 2016/0378549 | A1* | 12/2016 | Irish | H04L 67/1002 |
| | | | | 718/107 |

\* cited by examiner

FIG. 11

DEATH CARE MANAGEMENT SYSTEM AND METHOD

PRIORITY

This application claims priority to U.S. Provisional Patent Application Ser. No. 62/138,656, filed Mar. 26, 2015, entitled "Death Care Management System and Method," the disclosure of which is incorporated by reference herein.

FIELD

The disclosed technology pertains to a system for managing tasks and transactions relating to death care.

BACKGROUND

There are more than 22,000 funeral homes in the United States, with many being independently or family owned. Many of these independent funeral homes have processes for managing tasks and transactions relating to funerals that have developed over decades of business, though often these processes fail to leverage modern technologies effectively. As a result, the execution of a perfect funeral often relies upon dry erase boards, whiteboards, handwritten paper order forms, fax machines, and telephone calls. For example, in many funeral homes the planning, preparation, and scheduling of funeral services are managed by writing out tasks on a whiteboard and checking off or filling in information as tasks are completed. The whiteboard could include information about a reserved location for visitation, police escorts for a procession, a tailor hired to prepare burial garments, or even a hired hairdresser. While such a process is often adequate, there is a significant chance for error due to smudged or accidentally erased information, information written into the wrong column, or simply forgetting to add or remove a task or related information.

As another example, in many funeral homes the management and tracking of transactions between funeral homes and third parties that provide goods and services relating to a funeral is inconsistent or even non-existent. A funeral home might have several different vendors that provide concrete vaults for burial services. One vendor might accept orders and provide updates by email, another might accept orders via fax and provide updates by mail, yet another might accept order via phone and provide no updates unless requested. With no consistency in the manner that each vendor accepts and communicates about orders, the funeral home is in a position where it must adapt its processes to match an inconsistent and unreliable set of third party processes. However, it is not uncommon for a funeral home to be waiting on an update for shipping, having forgotten that the vendor they ordered the vault from does not provide shipping updates. Even worse, in some cases a funeral home may believe that they ordered a vault via phone or email when in fact the order was never received or recorded by the vendor, and, due to inconsistent practices in providing order updates, the error may not be realized until it is too late to have a vault ready for the burial ceremony.

What is needed, therefore, is an improved system for managing tasks and transactions related to death care.

BRIEF DESCRIPTION OF THE DRAWINGS

The drawings and detailed description that follow are intended to be merely illustrative and are not intended to limit the scope of the invention as contemplated by the inventors.

Figure 11:
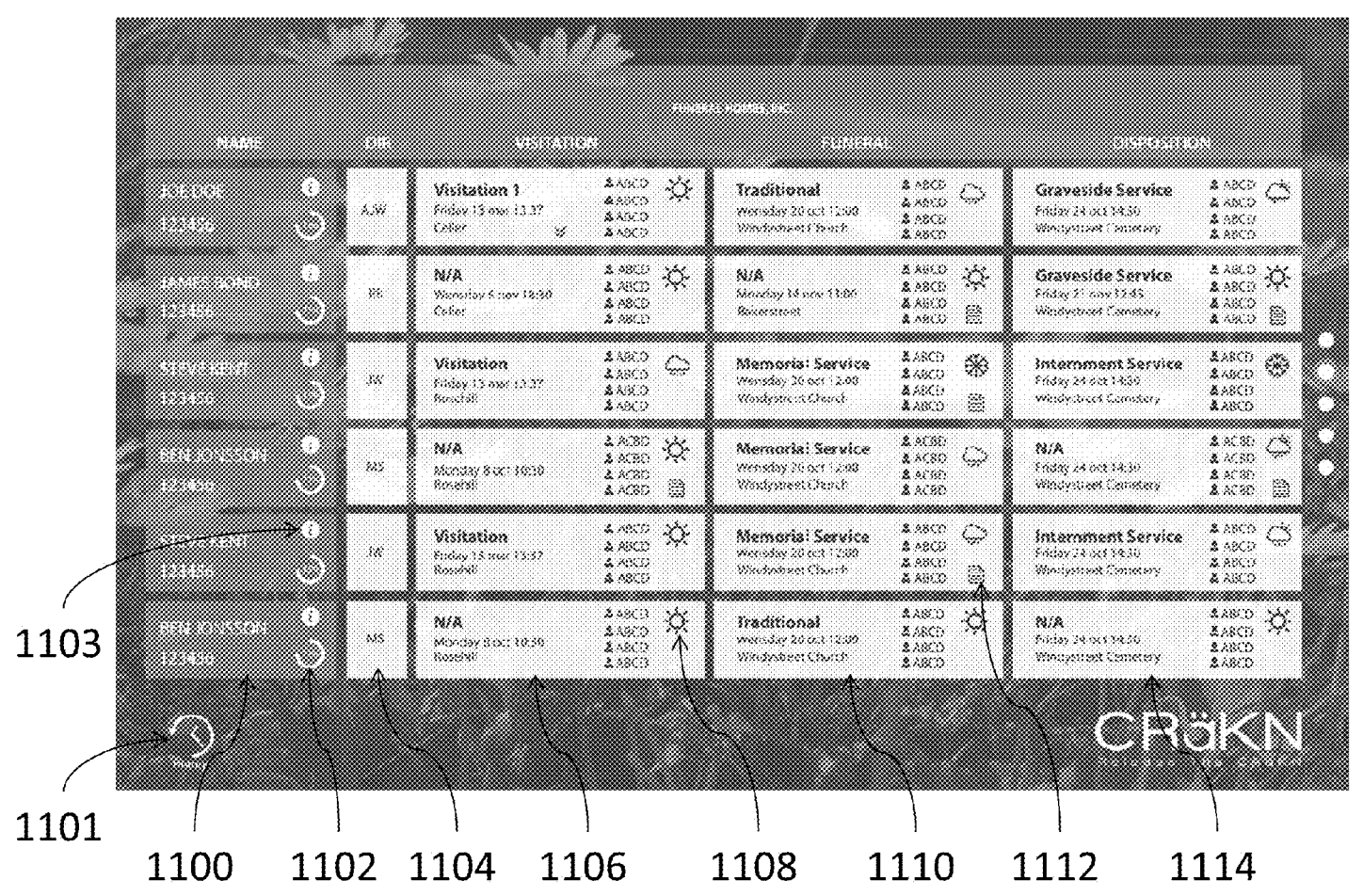

FIG. 11 is a screen capture showing an exemplary interface for viewing and interacting with tasks related to death care.

DETAILED DESCRIPTION

The inventors have conceived of novel technology that, for the purpose of illustration, is disclosed herein as applied in the context of a system for managing tasks and transactions relating to death care. While the disclosed applications of the inventors' technology satisfy a long-felt but unmet need in the art of death care management systems, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
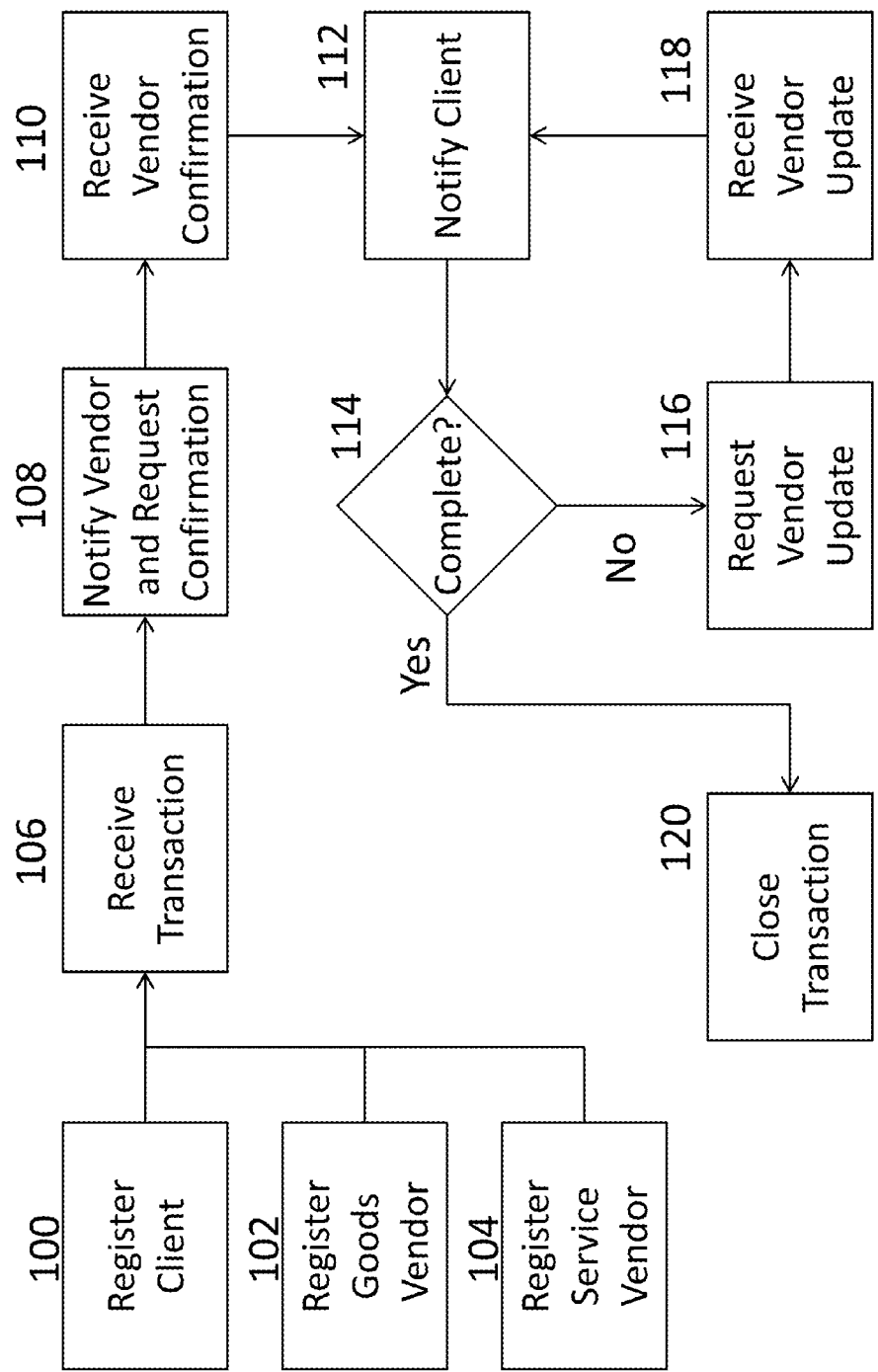
FIG. 1 is a flowchart of a set of exemplary high-level steps that a system could perform to manage transactions relating to death care.
Figure 10:
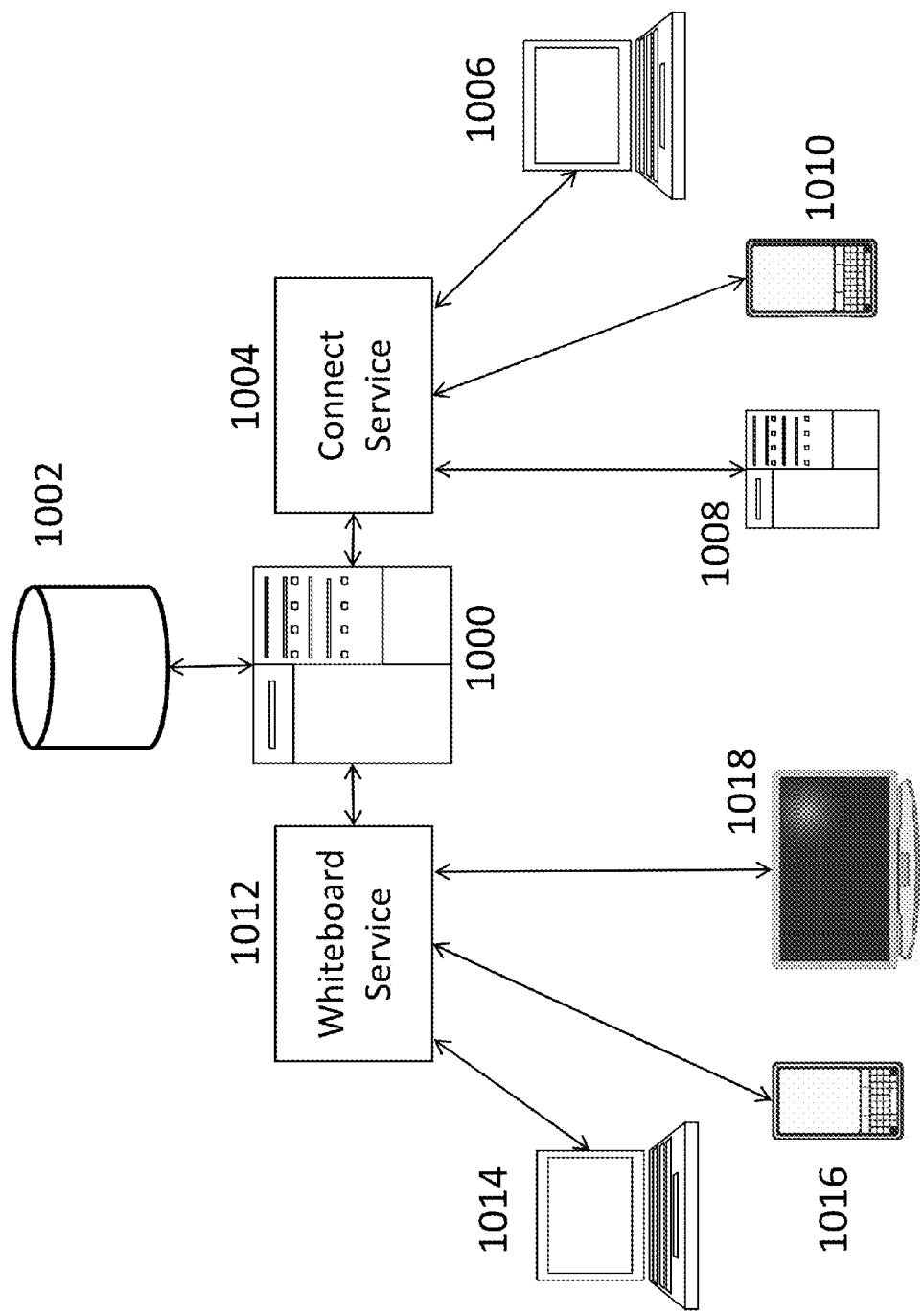
FIG. 10 is a schematic diagram of an exemplary system configured to manage tasks and transactions related to death care.

Turning now to the figures, FIG. 1 shows a flowchart of a set of exemplary high-level steps that a system, such as the exemplary system shown in FIG. 10, could perform to manage transactions relating to death care. In FIG. 10, a management server (1000) is communicatively coupled with a database (1002) and is configured to expose a Whiteboard service (1012) and a Connect service (1004) to users via a wide area network or other communication means. The management server (1000) may be one or more physical servers, virtual servers, computers, or other computing devices allowing for the processing and communication of data. The database (1002) may be one or more local databases, remote databases, distributed databases, physical storage drives, cloud storage drives, or other data structures or devices allowing for the storage and retrieval of data. The Whiteboard and Connect services (1012, 1004) may comprise, for example, websites, web services, or other similar interfaces accessible via, for example, web browser, application, HTTP, FTP, or other communication tools and standards. External users may interact with the Whiteboard service (1012) via, for example, a computer (1014) web browser, application, or other tool, mobile device (1016) web browser, application, or other tool, interactive smartboard or whiteboard (1018) web browser, application, or other tool, or other similar devices and tools. The Whiteboard service (1012) provides access to tools and methods that aid in managing tasks related to death care. External users may interact with the Connect service (1004) via, for example, a computer (1006) web browser, application, or other tool, mobile device (1010) web browser, application, or other tool, existing vendor system (1008) application or web service, or other similar devices and tools. The Connect service (1004) provides access to tools and methods that aid in managing transactions related to death care. For example, a funeral home client may order or reserve various goods and services from participating vendors through the Connect service (1004), which will manage the communication and tracking of the transaction.

The system of FIG. 10 may register clients (100), register goods vendors (102), or register service vendors (104). In some embodiments, the system may also allow registration of other entity types. For example, a data provider may register with the system and provide data to the system via the connect service (1004). Data provided may include analytics data for services, products, vendors, venues, or other information. For example, data provided may include information describing customer satisfaction, timeliness, costs of one or more hairdressing services, and/or various other kinds of data associated with various kinds of death care products and services. Data consumers may also register with the system in order to consume various types of data. Consumed data may include high level de-identified analytics data, such as average time or cost for different services, average cost for products, or other analytics. Consumed data may also include vendor specific data, such as timeliness and satisfaction levels for one or more vendors. Consumed data may contain data provided by data providers, as well as data generated through user interactions with the connect service (1004) and whiteboard service (1012). For example, communications and updates on services and goods passed through the connect service (1004) may be used to generate high level data indicating the length of time it takes to perform a service or receive a good. As another example, user interactions with the whiteboard service (1012), such as adding, updating, and closing tasks, may be used to generate high level data indicating the quality and timeliness of services provided by funeral homes in a region.

Registration may be performed by, for example, receiving information submitted via a user device (1006, 1008, 1010, 1014, 1016, 1018) or by manual configuration via the management server (1000). Information provided during registration could include identifying information for the client or vendor such as name, address, and type of business, contact information and preferences such as phone number or email address, and authentication information such as usernames, passwords, and configurations settings that may be required to communicate with the system via an existing vendor system, a web service, API, or other interface. For example, one vendor or client may register with the system and choose their primary method of interacting with the system to be a website or mobile phone application. This may be a good choice for a vendor or client that does not have an existing sophisticated system (1008) to manage their transactions, but does have access to computers (1006) or mobile devices (1010). This preference, as well as a username and password unique to that user could be provided during registration.

As another example, one vendor or client may register with the Connect service (1004) and choose their primary method of interacting with the system to be via a web service or API that communicates with an already existing vendor or client system (1008). In this manner, the Connect service (1004) can interact with an existing client system (1008) through direct communication via an API or web service, rather than replacing it entirely. This may be a good choice for a vendor or client that has already has a computer system in place that manages transactions internally. Alternately, an existing client system (1008) may be an existing website where the vendor allows clients to manually purchase goods or reserve services. In such a case, the Connect service (1004) may interact with the existing client website through browser automation tools that could allow the Connect service (1004) to automatically reserve services or order goods through the vendor website. This preference, as well as authentication and identification information that will allow the client system (1008) to interact with the Connect service (1004) could be provided during registration. As yet another example, one vendor or client may register with the Connect service (1004) and choose their primary method of interacting with the service to be via automated phone call or text. This may be a good choice for a vendor or client that would like to minimize the technological requirements for using the Connect service (1004). This preference, as well as one or more contact phone numbers could be provided during registration.

Upon registration (100, 102, 104) of a client and vendor, a transaction may be received (106) from a client indicating that a client has requested services or goods from a vendor. By using the stored communication preferences and information for a vendor, the Connect service (1004) can notify the vendor of the transaction via their preferred method and request that the vendor confirm receipt and acceptance of the transaction (108). For example, for some vendors this notification could be delivered via a website or email, and confirmation could be requested by offering a clickable button at the website or a formatted email reply. For other vendors, this notification could occur by entering the transaction directly into the existing vendor system (1008) via a web service or API and requesting an automatically generated invoice or confirmation. For other vendors, this notification could occur by automated phone call or text message, and confirmation requested via an automated phone menu system or via formatted text message response. When a vendor confirms the transaction, whether by website, email, web service, API, phone, text, or other communication, the system received the vendor confirmation (110) and then notifies the client (112) via the clients preferred method of contact, which could be website, email, web service, API, phone, text or other communication. In some embodiments, the communication between client and vendor could occur through multiple communications rather than just one, such that one vendor could be notified (108) via both website and text, and could similarly confirm the transaction (110) via website or text. Similarly, in some embodiments, clients could receive notifications (112) via one or more configured communication preferences.

Once a transaction has been confirmed (110) and the client has been notified (112), the transaction can be managed throughout one or more stages while the involved goods and services are prepared until the transaction is complete (114) and the transaction can be successfully closed (120). While the transaction is not complete (114), the service may request one or more vendor updates (116) from the vendor, via the configured communications preferences, and receive one or more vendor updates (118) in response, via the configured communication preferences, in each case notifying the client (112) of the vendor update (118), also via the configured communication preferences. As an example, where an order for a concrete burial vault has been received (106) by the Connect service (1004), passed to the vendor (108), and confirmed by the vendor (110), the transaction would not be complete (114) until the successful delivery of the concrete burial vault. Before delivery and completion of the transaction (114), the system may automatically request one or more vendor updates (116) related to the transaction, with the number and type of requests varying based upon the goods or services associated with the transaction. In the case of a concrete burial vault, the service may request a vendor update when the burial vault is ordered, when shipment of the burial vault begins, and when delivery of the burial vault is completed. In each case of a vendor request (116), a vendor update, such as confirmation that the vault has been created, or delivered, is received by the service (118) and passed to the client as a notification (112).

Figure 2:
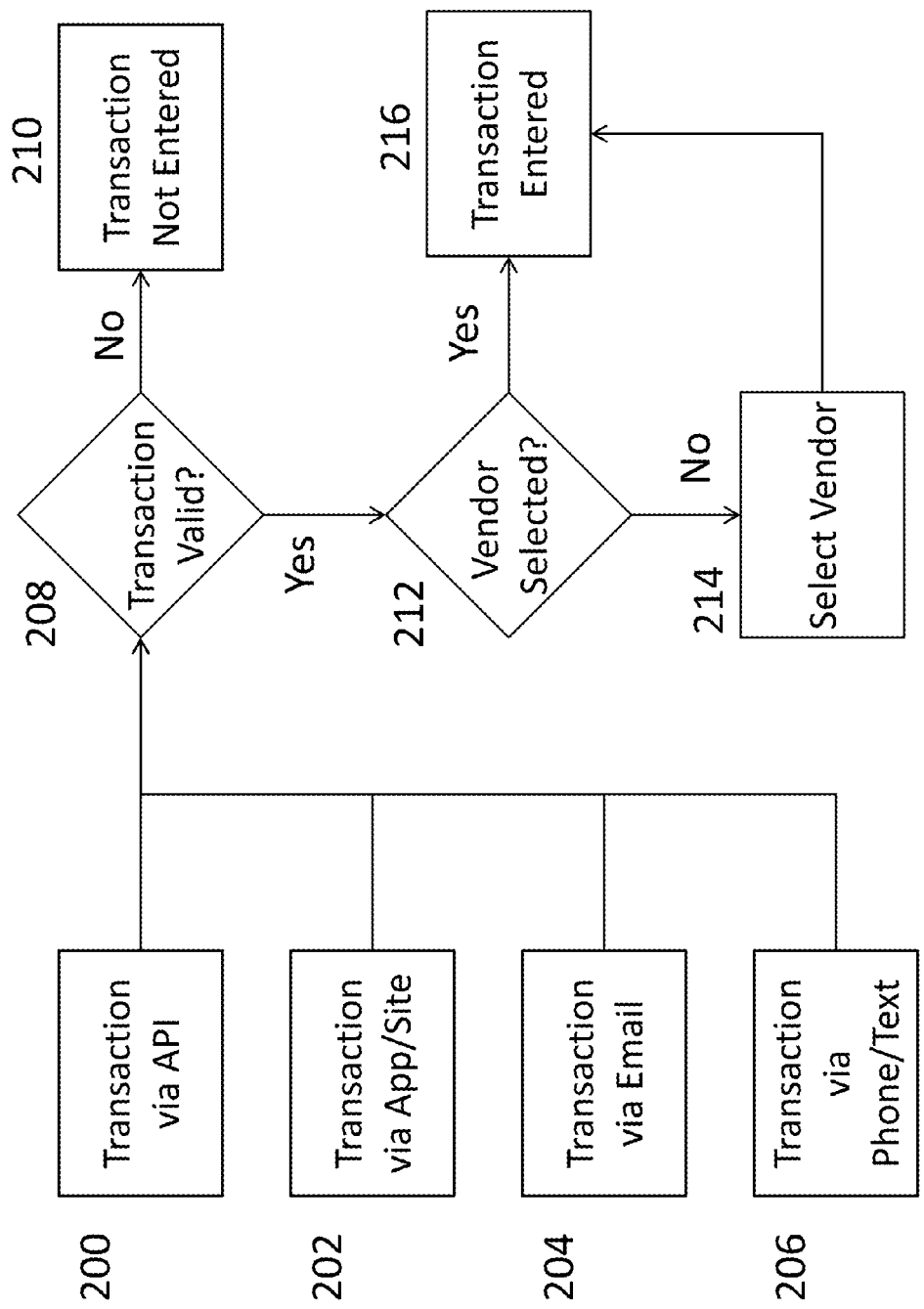
FIG. 2 is a flowchart of a set of exemplary steps that a system could perform to receive transactions from a client.

Turning now to FIG. 2, that figure shows a flowchart of a set of exemplary steps that a system could perform to receive transactions from and/or for a client (106). Transactions from a client may be received via, for example, web service or API (200) when received from an existing client system (1008) or application, mobile application or website (202), email (204), automated phone menu or text menu (206), or other communication methods. In some embodiments, validation of the transaction may occur upon receipt (208). Validation could include verification that all required information is present and conforms to validation rules, such as confirming that a supplied address includes both characters and integers, or confirming that a supplied price only includes integers. If the transaction fails one or more validation rules, the transaction will not be entered (210) and a notification will be sent to the client and system administrators detailing the deficiency. In some embodiments, certain deficiencies in a transaction may be automatically addressed by the service. For example, where no vendor is initially selected (212) when submitting the transaction, the system may automatically select a vendor (214) that supplies the requested goods or services within the requested area or region. Other types of deficiencies may be automatically addressed by the service where it is deemed to be convenient for the client to quickly register transactions and where the automatically corrected deficiency is not of critical importance to the client. Where a vendor is initially selected for the transaction, or where there is no deficiency, the transaction will be entered (216) by the service.

Figure 3:
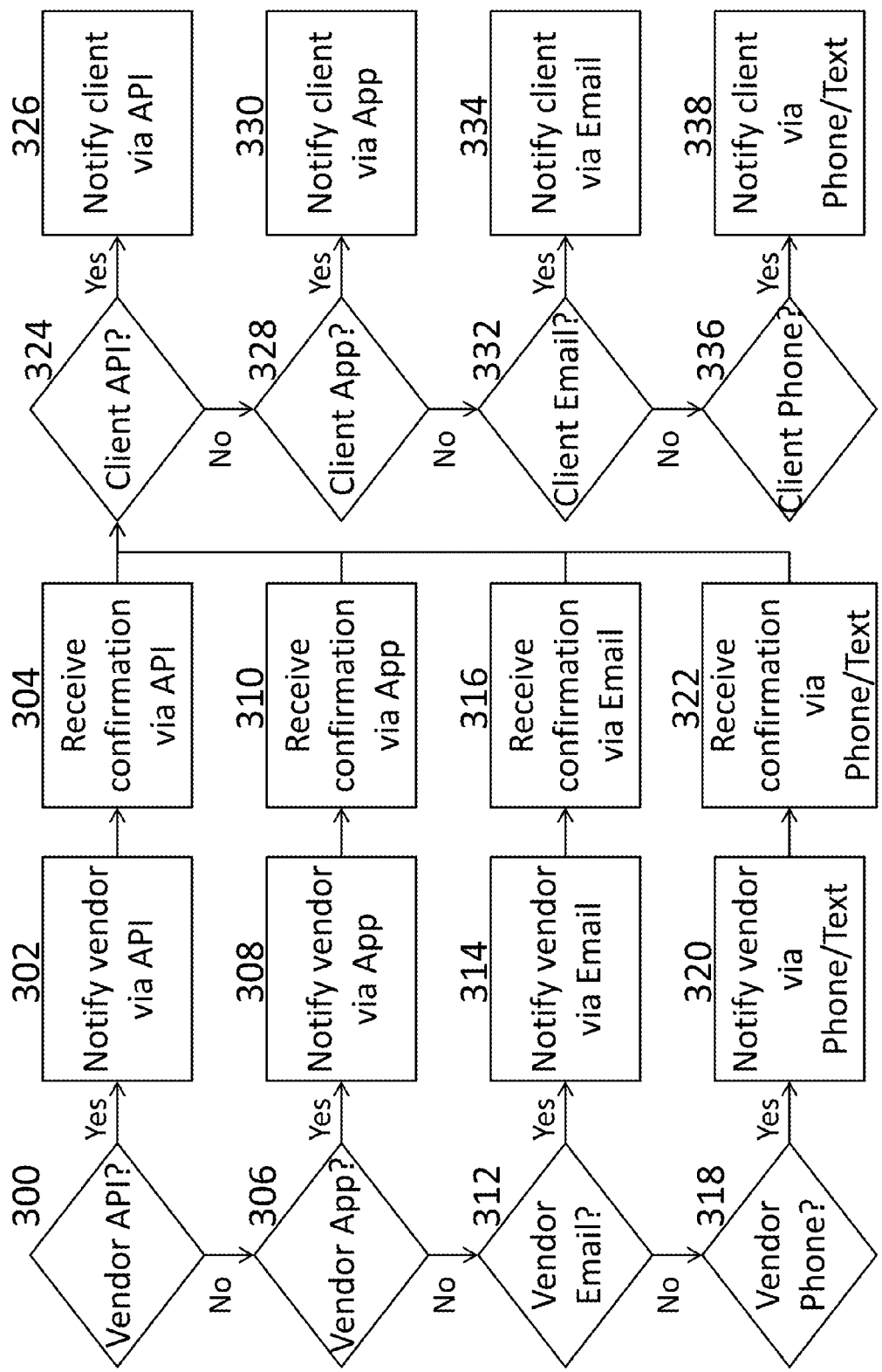
FIG. 3 is a flowchart of a set of exemplary steps that a system could perform to receive information from a vendor and deliver it to a client.

Turning now to FIG. 3, that figure shows a flowchart of a set of exemplary steps that a system could perform to receive information from a vendor (110) and deliver it to a client (112). While shown in the context of a vendor receiving a request for confirmation and providing confirmation to a client, the same general method can be applied to any communication between client and vendor, such as requesting vendor updates (116), receiving vendor updates (118) and notifying a client (112). As shown in FIG. 3, when a transaction is entered (216), the service will identify one or more methods of communication enabled for the vendor associated with the transaction. If the vendor may be communicated with via API or web service (300), the transaction notification may be provided to the vendor using the configuration provided during registration that will allow the transaction to be directly submitted to the vendor system (1008) via an available API or web service (302). Vendor confirmation of the transaction may then be received by the system (304) via the available API or web service. Vendor confirmation may be automatically generated by the vendor system (1008) or manually generated by a vendor after time for review.

If the vendor may be communicated with via application, mobile application, or website (306), the transaction notification may be provided to the vendor using a website, application, or mobile application (308). Vendor confirmation of the transaction may then be received by the system via the website, application, or mobile application (310). Vendor confirmation may be automatically generated based upon vendor configuration of a website, application or mobile application, or manually generated in response to a notification received via a website, application, or mobile application. For example, in the case of a mobile application, the service may cause a notification message or sound to occur on a vendor mobile device (308). The notification on the vendor mobile device may be viewed and may offer a button or other interactive element that the vendor may interact with to cause a confirmation to be generated and received by the service (310). Notification and receipt via a website or application could occur similarly.

If the vendor may be communicated with via email (312), the transaction notification may be provided to the vendor via email (314). Vendor confirmation may be automatically generated by configured email responses, or may be manually generated by a vendor in response to an email and received by the service (316). In the case of manual generation of a vendor confirmation, the email notification (314) provided to the vendor may be formatted such that a reply with additional pre-defined information entered into the subject line or body of the email may be received by the service (316) and automatically interpreted based upon the known formatting.

If the vendor may be communicated with via phone or text (318), the transaction notification may be provided to the vendor via phone or text (320). Notification via phone may be in the form of an automated phone call, while notification via text may be in the form of a text message or text message and attached image or file. Vendor confirmation may be generated manually by the vendor in response to a call or text and may be received by the service via phone or text (322). For example, an automated phone call notifying a vendor (320) of a transaction may deliver a voice messages describing the pertinent details of the transaction, and then prompt the answering vendor to press one or more keys to confirm the transaction, modify the transaction, refuse the transaction, or attempt to immediately call the client for further discussion. Such confirmation or other response will be received by the service (322) via the automated phone call. In the case of a text message, the text message notification (320) may contain text or images describing the pertinent details of the transaction, and prompt the receiving vendor to reply with one or more defined responses that, when received by the service (322), will indicate confirmation of the transaction, refusal of the transaction, modification of the transaction, or a need for follow up by phone for further discussion.

When confirmation or communication intended for a client has been received from a vendor, the service may determine from registration information whether the client the notification is intended for may be communicated with via API or web service (324). If the client is configured for communication via API or web service, the vendor confirmation or communication may be provided to the client via API or web service (326) and entered directly into the client's existing system (1008) or other system. If the client is not configured for communication via API or web service (324), or if the client prefers multiple types of communication, the service may determine whether the vendor confirmation or communication may be provided to the client via application or website (328). If the client is configured for communication via application or website (328), the vendor confirmation or communication may be provided to the client via application, mobile application, or website (330). If the client is not configured for communication via application or website (328), or if multiple communication types are configured, the service may determine whether the vendor communication may be provided via email (332). If the client is configured for email communication (332), the notification or communication may be provided via email (334). If the client is not configured for email communication (332), the service may determine whether the communication may be provided via phone or text (336). If the client is configured for phone or text communication (336), the communication may be provided via automated phone call or text (338). While FIG. 3 shows several types of configurable communication preference for both vendors and clients, other communication types exist that can be added or substituted into the steps of FIG. 3.

Figure 4:
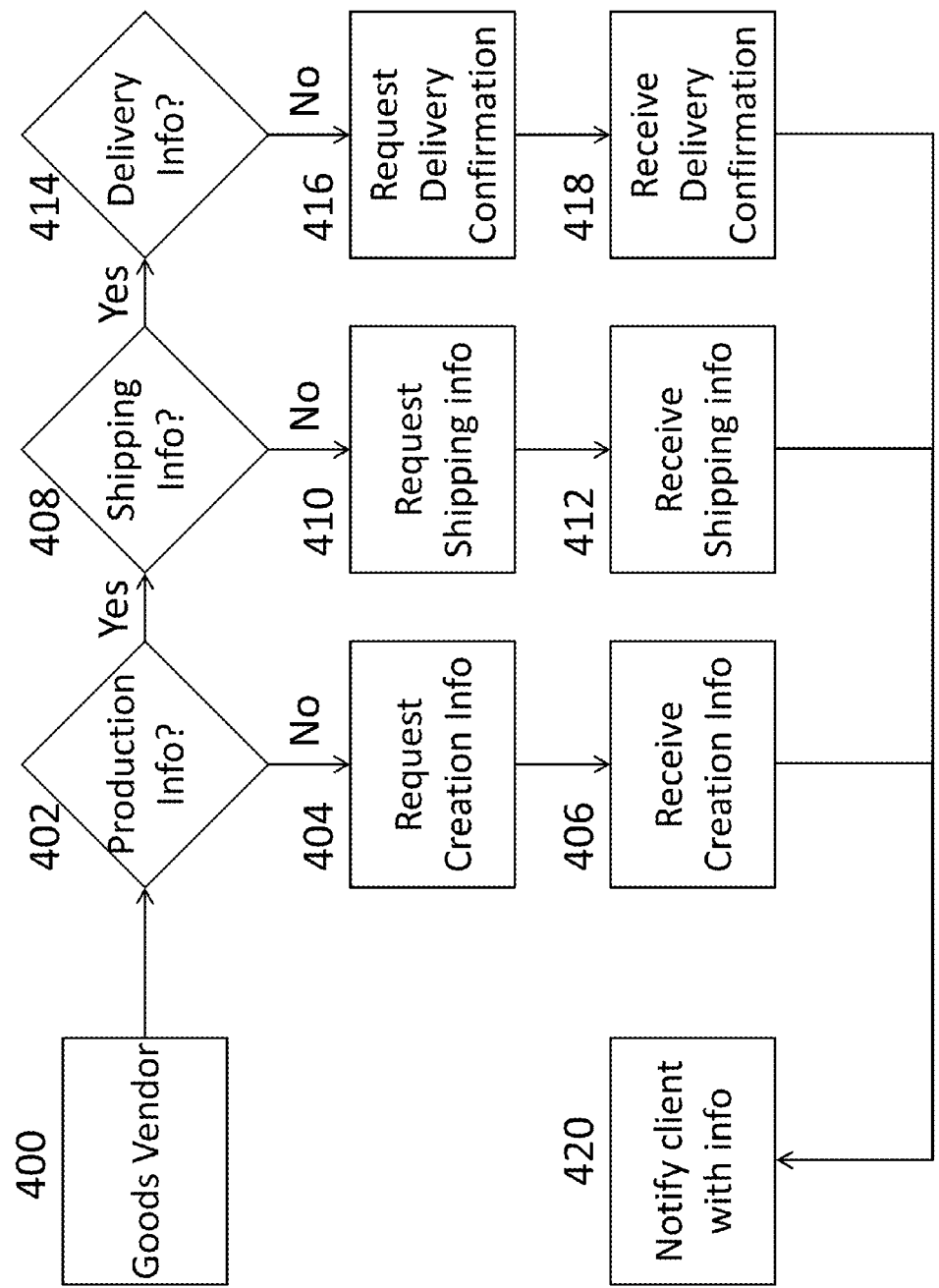
FIG. 4 is a flowchart of a set of exemplary steps that a system could perform to receive information from a vendor and deliver it to a client.

Turning now to FIG. 4, that figure shows a flowchart of a set of exemplary steps that a system could perform to receive information from a vendor and deliver it to a client. For example, the steps of FIG. 4 could be used as part of a method for requesting (116) and receiving (118) vendor updates for client notification (112) from a vendor of goods while the providing of goods is not yet complete (114). When goods have been ordered (400), the client may desire to receive regular updates up to the moment that the goods are delivered. Such updates could include, for example, information relating to production of the goods (402), information relating to shipping of the goods (408), or information relating to the delivery of the goods (414). When a client has ordered goods, and has not yet received information relating to the production of the goods (402), a request for information relating to the creation or production of the goods can be provided to the vendor (404). Such a request might be for information relating to the time that manufacturing of the goods was started or the time that the goods are estimated to be completed. Requested production information may be received (406) from the vendor and provided to the client (420). The request and communication of the information may be communicated to the vendor, received from the vendor, and provided to the client by using steps similar to those shown in FIG. 3. Requests for information may be generated automatically by the service based upon a configured schedule or manually by a client.

When shipping information has not yet been provided (408), a request for shipping information may be generated and communicated to the vendor (410). Received shipping information (412) may then be provided to the client (420). Similarly, when delivery information has not yet been provided (414), a request for delivery confirmation may be generated and provided to the vendor (410). Received delivery information (418) may then be provided to the client (420). As an example, when a concrete burial vault has been ordered (400), the service may be configured to automatically generate a request for creation information (404) twenty four hours after order confirmation. The vendor may receive the request and provide an information update via any of the described communication methods. The information received (406) may indicate that the concrete burial has been created and is currently awaiting shipment. In this manner, the client can quickly receive information that provides them the confidence that the burial vault has been created without having to call and speak to someone directly. Various other types of information relating to the purchase and delivery of goods may be added or substituted into the steps of FIG. 4 beyond those shown.

In some versions, ordered goods could be marked with unique identifiers such as barcodes or other optical codes, or tagged with wireless identifiers such as NFC or RFID chip identifiers. Once a particular ordered good is associated with a unique identifier, identification of the goods can be performed in a semi automated manner using a user device with appropriate capabilities to scan and receive information from the optical or wireless identifier. For example, when a coffin is ordered for a particular decedent, the order will be associated with that decedent in a database. When the coffin is produced, a unique identifier will be marked or placed on the coffin and also associated with the decedent. After being associated with a unique identifier, a user device, such as a mobile phone or other handheld device can be used to interact with the unique identifier via an optical scanner or wireless communicator. This could be useful to, for example, use a mobile phone to scan a coffin and automatically transmit creation information for the coffin to be received (406) by the system, scan a coffin and automatically transmit shipping information to be received (412) by the system, scan a coffin and automatically transmit delivery information to be received (418) by the system, or similar information sharing steps. Additionally, such a unique identifier being physically associated with the coffin could be useful at other times for identification purposes. For example, a user may scan a coffin to quickly and accurately identify a decedent or burial service that the coffin is associated with at different points during preparation and performance of a burial service, to ensure that the correct coffin is being transported to the visitation site, and then to the cemetery.

Figure 5:
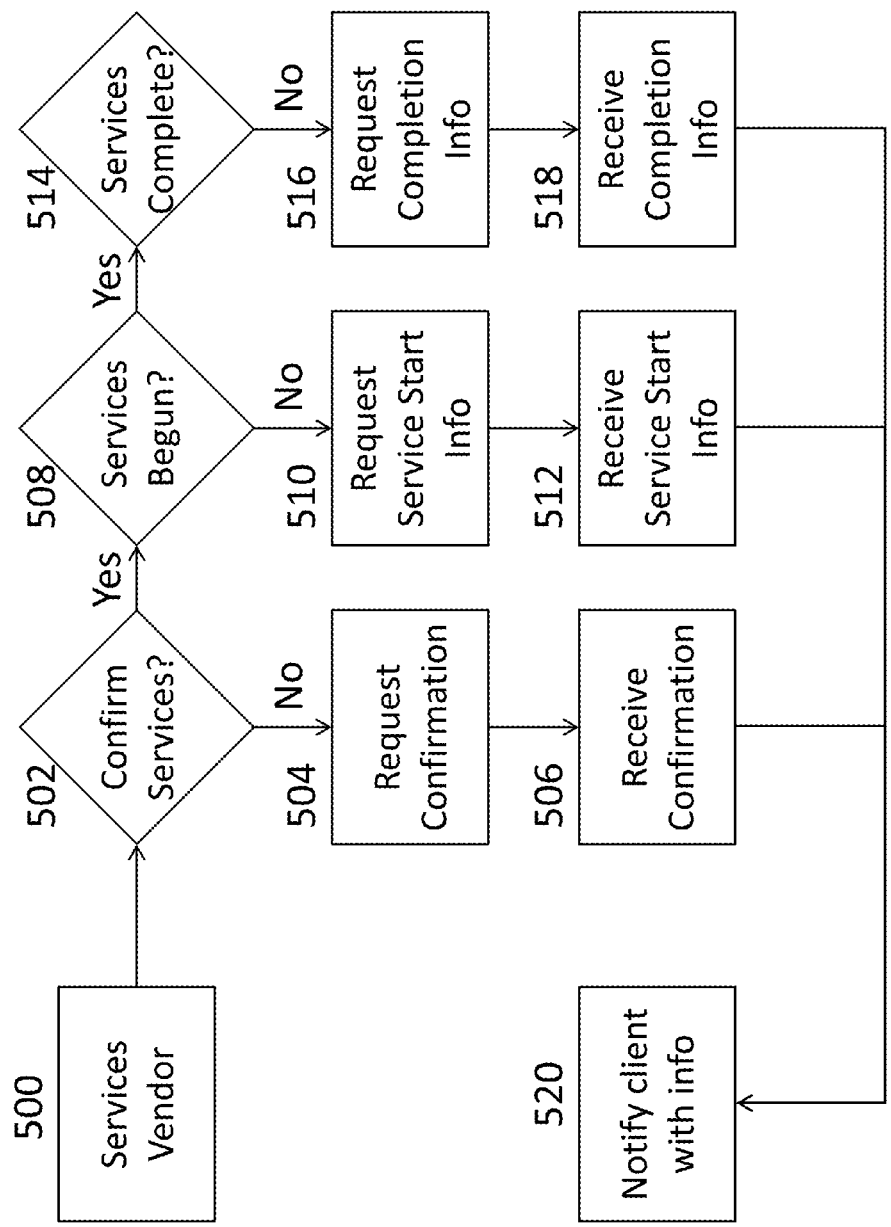
FIG. 5 is a flowchart of a set of exemplary steps that a system could perform to receive information from a vendor and deliver it to a client.

Turning now to FIG. 5, that figure shows a flowchart of a set of exemplary steps that a system could perform to receive information from a vendor and deliver it to a client. For example, the steps of FIG. 5 could be used as part of a method for requesting (116) and receiving (118) vendor updates for client notification (112) from a vendor of services while the performance of the services is not yet complete (114). When services have been requested (500), the client may desire to receive regular updates until the performance of the services is complete. Such updates could include, for example, a confirmation before the services begin (502), a notification that performance of the services has begun (508), or a notification that performance of the services has been completed (514). When a pre-service confirmation has not yet been received (502), a request for confirmation may be generated and provided to the vendor (504). This may be useful where a hairdresser is scheduled to perform services several days in the future, so that a client may request confirmation twelve or twenty four hours before the scheduled date that the hairdresser is still available and planning to perform the services. A received confirmation of the services (506) may then be provided to the client (520). The request and communication of the information may be communicated to the vendor, received from the vendor, and provided to the client by using steps similar to those shown in FIG. 3. Requests for information may be generated automatically by the service or manually by a client.

When service start information has not yet been provided (508), service start information can be requested (510) and received (512) by the service and provided to the client (520). When service completion information has not yet been provided (514), service completion information can be requested (516) and received (518) by the service and provided to the client (520). As an example, when a hairdresser has been reserved to perform services at a certain time, a confirmation may be automatically generated and provided to the hairdresser twelve hours before the scheduled service via one of the communication methods already described (504). The hairdresser may confirm that they are still available and planning to provide the service via one of the described communication methods, which the system may receive (506) and provide to the requesting client (520). Similarly, a request for service start information may be generated at the scheduled start time (510), and a request for service completion information may be generated at the estimated completion time. In each case, the service may receive the requested information (512, 518) and provide it to the client (520). In this manner, a requesting client may receive a steady stream of information so that they can be confident that the services are progressing to completion without having to personally or manually intervene or request information.

As with goods, the integration of a unique identifier such as an optical identifier or a wireless identifier like an RFID or NFC chip may be used to aid in the semi-automatic tracking and updating of services. For example, an NFC or RFID chip having a unique identifier could be placed on a decedent upon intake at a funeral home. This unique identifier could then be associated with the decedent in the database. Once associated, a user device could be used to read the unique identifier and, through the service, obtain the identity of the decedent. This could be useful where, for example, a hairdresser is beginning to perform hairdressing services on a decedent. The hairdresser could use a mobile phone or other user device to scan the RFID or NFC tag and obtain the unique identifier, and then send this information to be received (512) by the system as part of the services start information. In this manner, if the services are about to be performed on the wrong decedent, the mistake can be identified before the services are erroneously performed. In some versions, the RFID or NFC chip could be constructed from heat resistant materials or placed in a heat resistant enclosure prior to being placed with or attached to the decedent. This could be useful when the requested services are crematory services. For example, the wireless identifier could be scanned by a user device before cremation and received (512) by the system to prevent erroneous cremations; and after cremation, the decedent's remains as well as the heat resistant wireless identifier could be placed in a container. In this manner, even after cremation, the wireless identifier remains associated with the decedent's remains and ensures an unbroken chain of identification.

While FIGS. 4 and 5 have been described in terms of a client requesting information from a vendor of goods or services, it should be understood that in some embodiments vendors may provide regular updates without first receiving a request. In some embodiments, unsolicited updates may be provided based on automatic processes, such as automated processes running on a vendor's existing system (1008), or by way of automated tracking of goods or service providers. In such an embodiment, a good such as a concrete burial vault may have an attached iBeacon, RFID, GPS device, or other device which can self-locate in some manner. For example, if an RFID is uniquely associated with a burial vault at the time of ordering, the RFID may be detected by an RFID reader when it is first attached to an ordered burial vault. It may be detected several other times, such as when the burial vault is placed in storage and awaiting pickup, when the burial vault is picked up by a freight carrier, and when the burial vault is dropped at a client location or burial site. Each point of detection may be logged by the system and reported to the client by an automated notification and update process, similar to those notification processes described in FIGS. 4 and 5.

Other technologies that may be used as part of the tracking, update, and notification processes include Bluetooth low energy ("BLE"), barcode identification, or GEO fencing. For example, a service provider carrying a device configured to communicate with the system via BLE may trigger an update when they arrive at a location and their BLE capable device communicates with a BLE capable device at the location. As another example, GEO fencing could be used to track service providers carrying a GPS capable device, such as a mobile phone, as they travel to a location. The service providers GPS capable device may communicate an update when the provider leaves their home location heading towards a scheduled service location, when the provider arrives at the scheduled service location, or when a service provider fails to leave a home location within a time that will allow them to reach a scheduled service location at the schedule time. Other implementations and uses of location identifying technology within the disclosed will be apparent in light of this disclosure.

Figure 6:
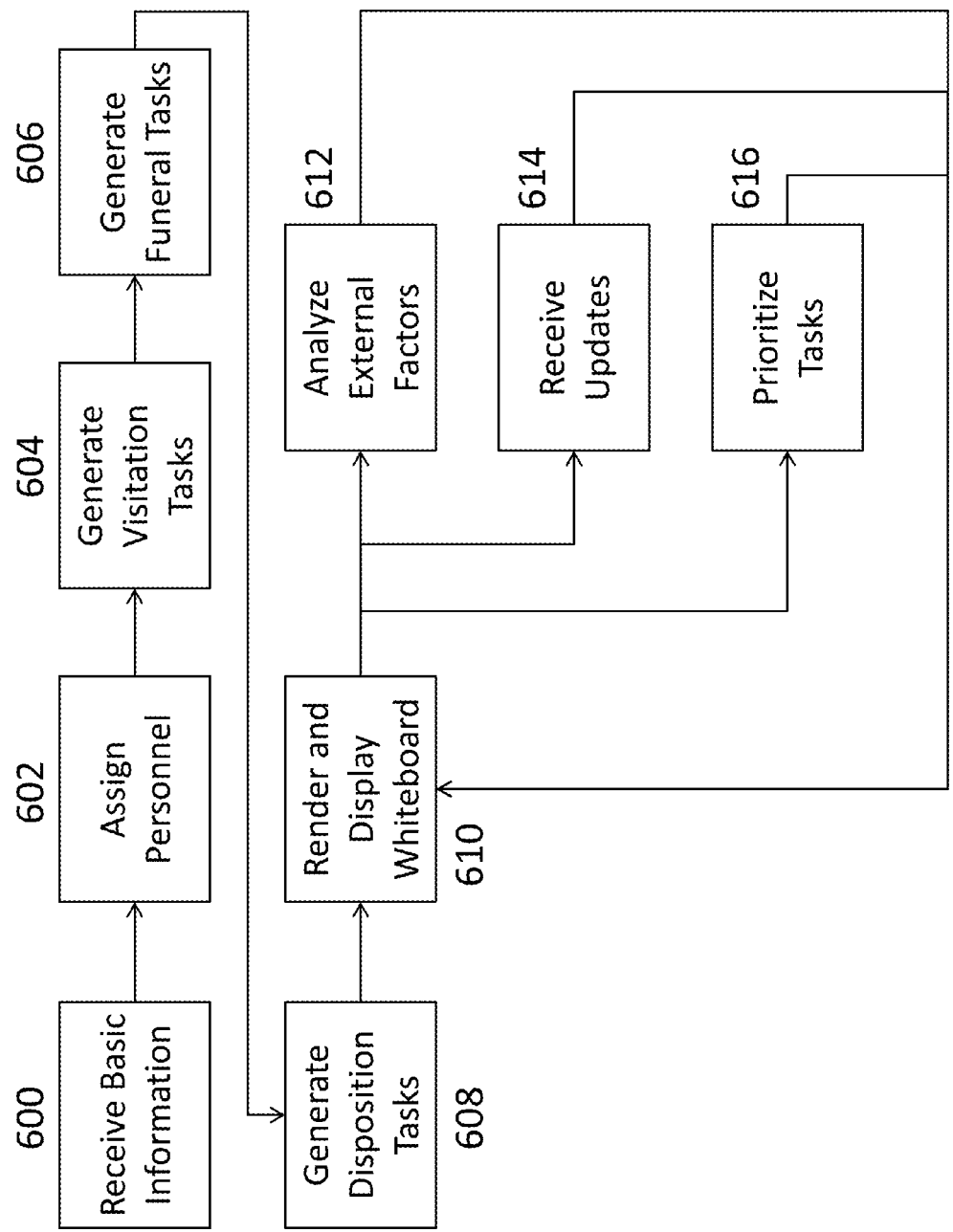
FIG. 6 is a flowchart of a set of exemplary high-level steps that a system could perform to manage and display tasks relating to death care.

Turning now to FIG. 6, that figure shows a flowchart of a set of exemplary high-level steps that a system could perform to manage and display tasks relating to death care. The steps of FIG. 6 could be performed by a system such as the one shown in FIG. 10, for example, and may be interacted with by users via a user device (1014, 1016, 1018) in communication with the Whiteboard service (1012). A brief discussion of FIGS. 11-18 may aid in the understanding of FIG. 6, as those figures show exemplary interfaces for viewing and interacting with the Whiteboard service (1012) and the system of FIG. 1 via a user device (1014, 1016, 1018). FIG. 11 shows such an interface having informational displays showing an event name (1100), completion percentage (1102), director (1104), visitation information (1106), weather information (1108), funeral information (1110), custom notes (1112), and disposition information (1114). A history view may be accessed via an interface element (1101) that would show historical information about past clients, past tasks, past venues, past directors, and past personnel. An information view, as shown in FIG. 12 may be accessed via an interface element (1103) that would show more detailed information on the required tasks, personnel, and completion statuses.

A completion percentage (1102) is a visual or numerical representation of the overall completion status of tasks relating to a certain event (1100). Completion percentage can be calculated based upon the number of completed tasks divided by the number of total tasks, or by other methods that may result in a number representative of progress towards completion of all tasks. Director information (1104) identifies one or more persons having responsibility or control over the successful execution of the event (1100). Visitation information (1106) shows the type of visitation that is scheduled, the time, date and location of the visitation, and the personnel that are associated with a visitation for an event (1100). Weather information (1108) shows the predicted weather for the time and date of a scheduled visitation (1106), funeral (1110), or disposition (1114). Weather information (1108) may be entered manually or may be configured to automatically pull from one or more weather information providers. Funeral information (1110) shows the type of funeral service that is scheduled, the time, date, and location of the funeral, and the personnel assigned to the funeral. Custom notes (1112) may be entered manually or generated automatically and may relate to a scheduled visitation (1106), funeral (1110), or disposition. Custom notes (1112) may be used to document non-standard information relating to an event, such as, for example, a specific song to be played during a visitation, a particular design theme that should be followed for a funeral venue, or a particular route that a procession should follow while traveling to the disposition. Disposition information (1114) shows the type of disposition service that is scheduled, the time, date and location of the disposition, and the personnel that are assigned to the disposition.

Figure 12:
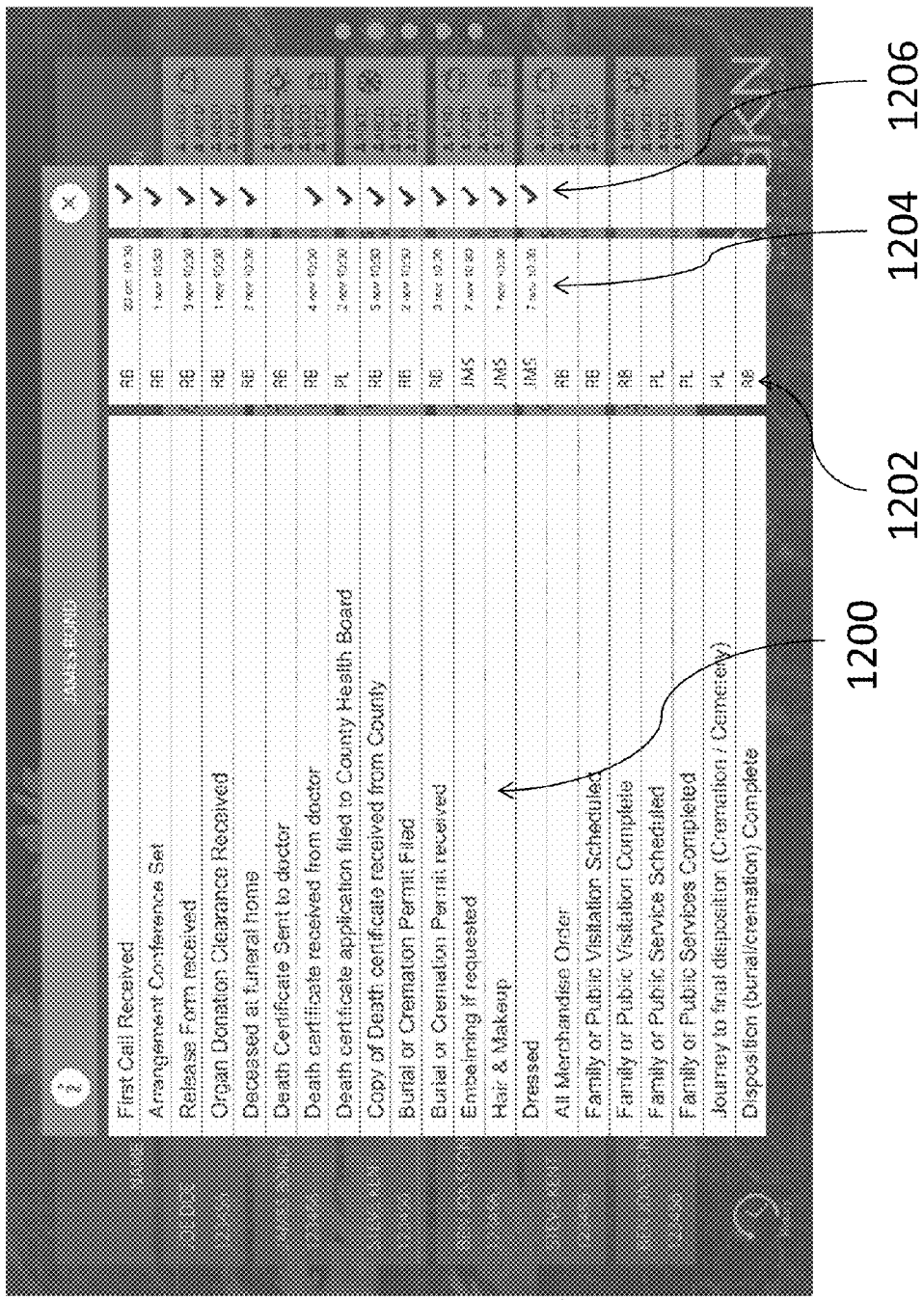
FIG. 12 is a screen capture showing an exemplary interface for viewing and interacting with tasks related to death care.
Figure 13:
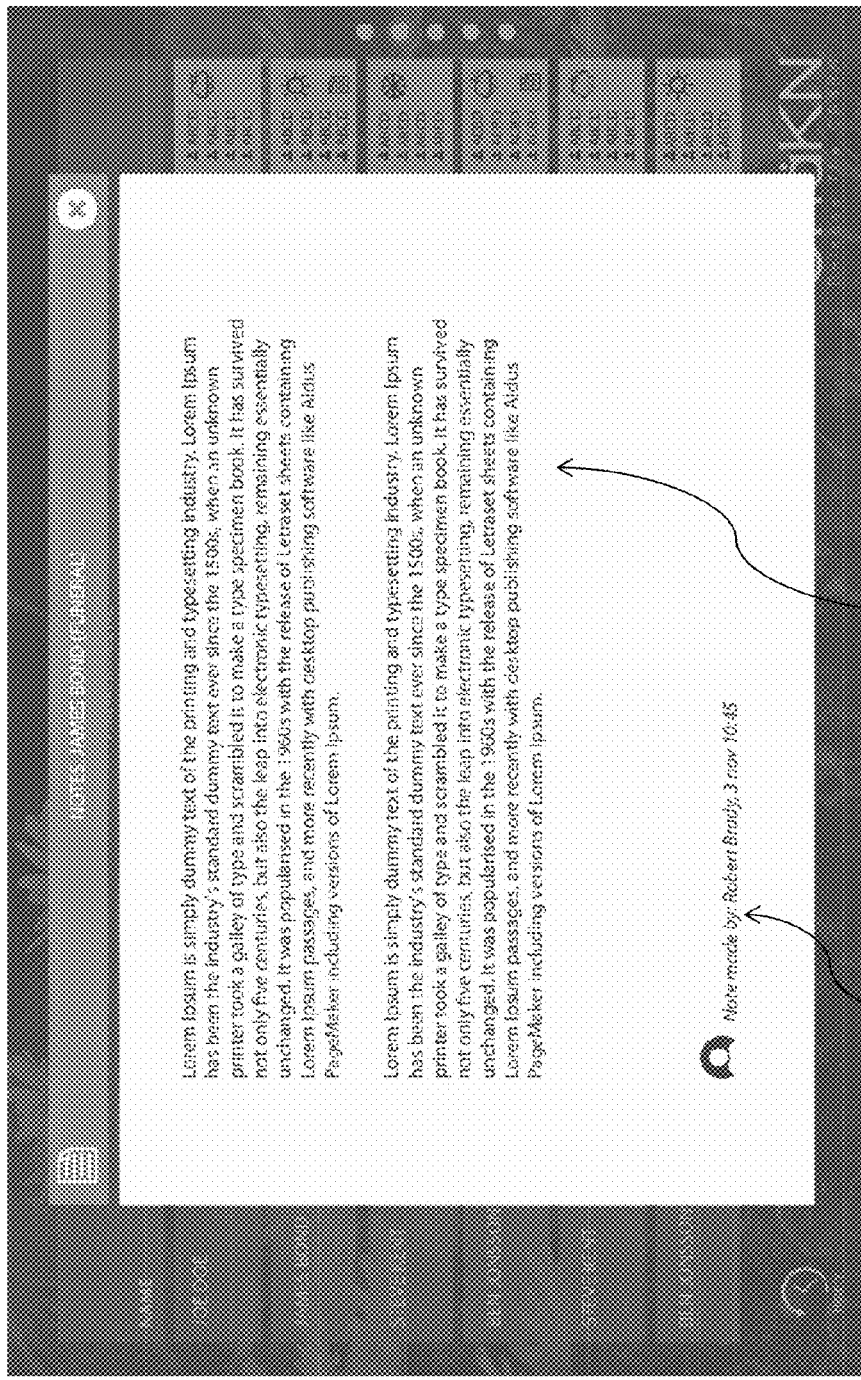
FIG. 13 is a screen capture showing an exemplary interface for viewing and interacting with tasks related to death care.

FIG. 12 shows the interface of FIG. 11 with a task list overlay that shows a number of tasks (1200) that must be completed before an event (1100) can be completely executed. For each task (1200), a personnel assignment is shown (1202), identifying one or more persons that are primarily responsible for completing the task. When a task is completed, an indicator (1206) can be placed signifying that the task was completed, as well as the time and date (1204) of completion. FIG. 13 shows the interface of FIG. 11 with a custom notes (1112) overlay that shows one or more custom notes (1302) entered by users as well as the time and date of creation and the user that created it (1300).

Figure 14:
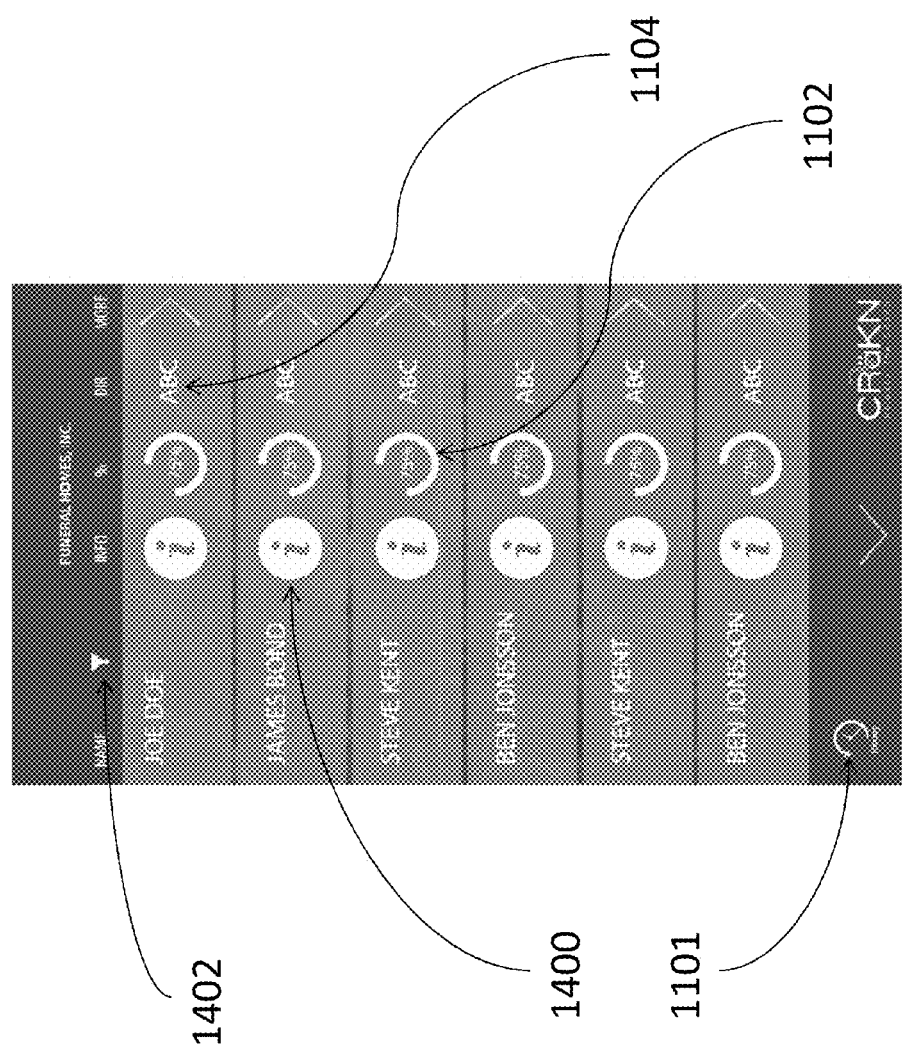
FIG. 14 is a screen capture showing an exemplary interface for viewing and interacting with tasks related to death care.
Figure 15:
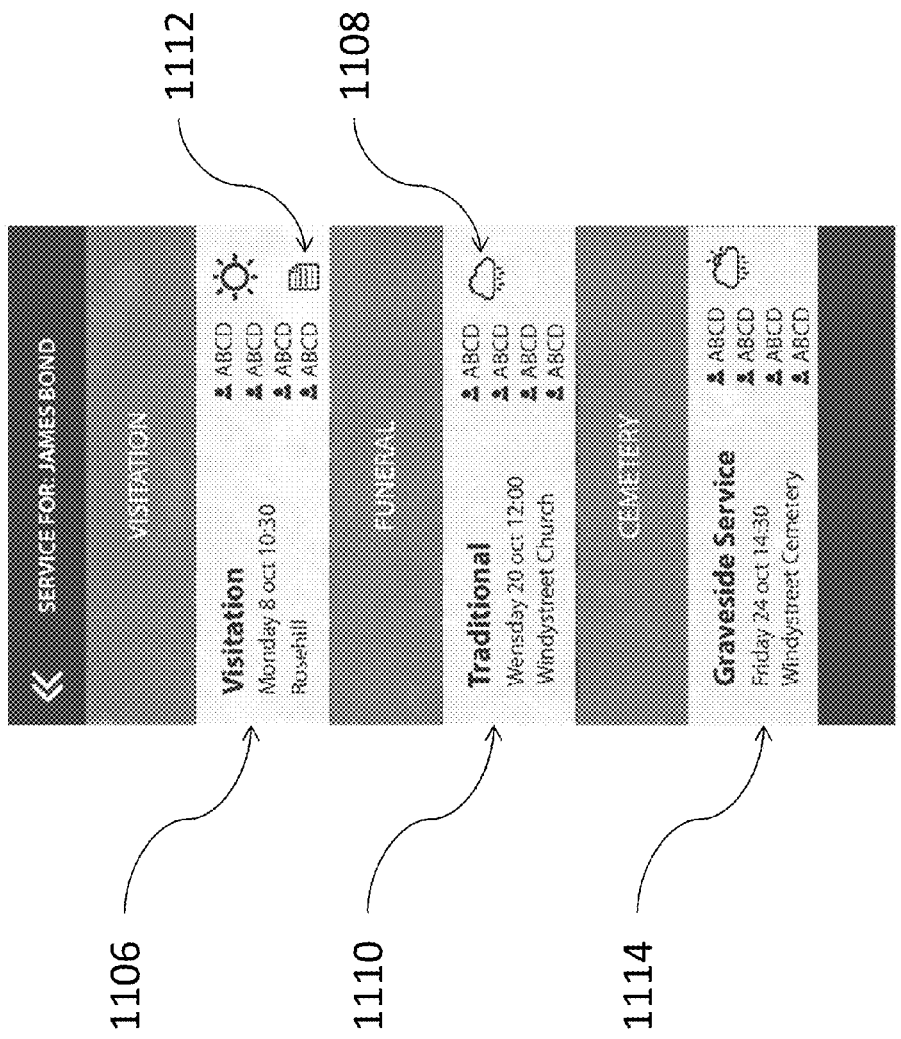
FIG. 15 is a screen capture showing an exemplary interface for viewing and interacting with tasks related to death care.
Figure 16:
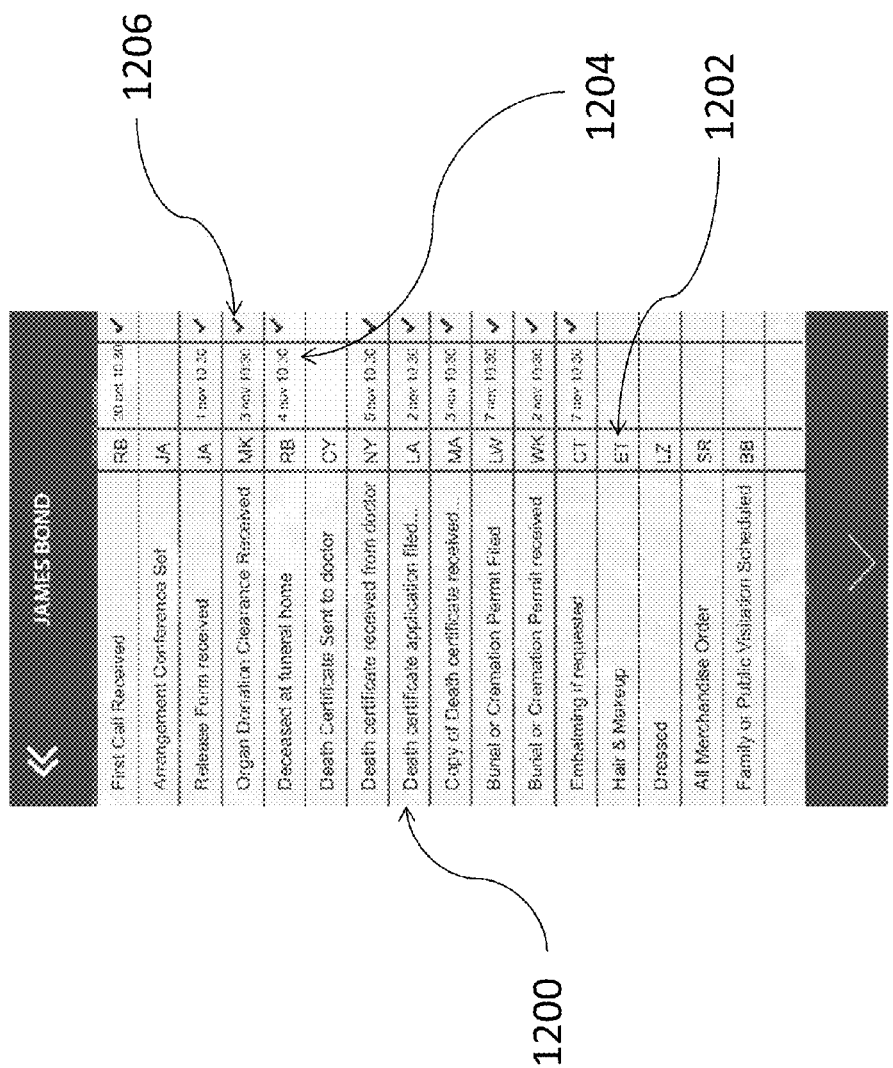
FIG. 16 is a screen capture showing an exemplary interface for viewing and interacting with tasks related to death care.
Figure 17:
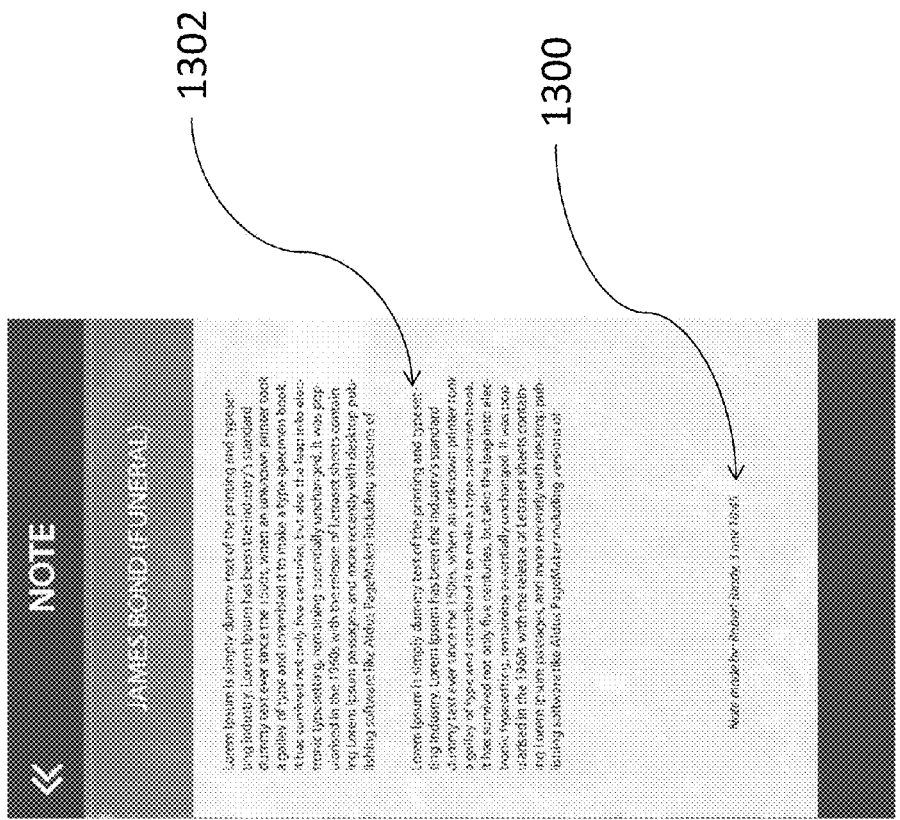
FIG. 17 is a screen capture showing an exemplary interface for viewing and interacting with tasks related to death care.
Figure 18:
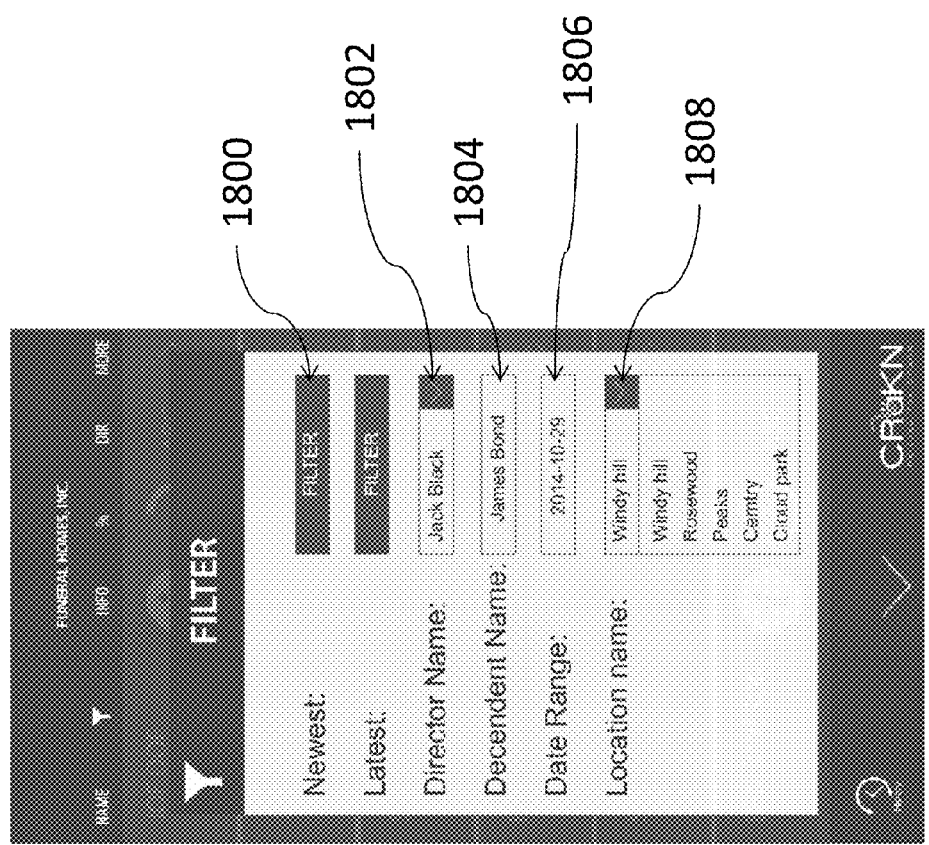
FIG. 18 is a screen capture showing an exemplary interface for viewing and interacting with tasks related to death care.

FIG. 14 shows an alternate interface that is formatted for optimal use on certain user devices. An information button (1400) may be selected by a user to display the interface shown in FIG. 15. A completion percentage (1102) and director information (1104) function similarly to the completion percentage (1102) and director information (1104) described in FIG. 11. FIG. 15 shows visitation information (1106), funeral information (1110), disposition information (1114), custom notes (1112), and weather information (1108), which have all been previously described in relation to FIG. 11. FIG. 16 shows a number of tasks (1200), assigned personnel (1202), time and date of completion (1204), and completion status (1206), which have all been previously described in relation to FIG. 12. FIG. 17 shows custom notes (1302) and the time, date, and author of a note (1300), which have all been previously described in relation to FIG. 13. FIG. 18 shows an interface offering a number of filtering and searching options including a filter by newest events or tasks (1800), filter by assigned supervisor (1802), filter by event name (1804), filter by date (1806), or filter by location or venue (1808). The interface of FIG. 18 may be accessed via an interface element (1402).

Returning to FIG. 6, basic information is received by the system (600) from a user device in order to create an event. Basic information could include a name, location, date of death, contact information for surviving family, religious preference, biographical information, or other information that may be collected when planning an event. The system may then assign personnel (602) to the event, including one or more supervisors and one or more assistants. Personnel could be assigned automatically based upon one or more factors such as availability, work load, location, experience, familiarity with other assigned personnel, or other factors. The system may then generate visitation related tasks (604), funeral related tasks (606), and disposition related tasks (608), that may include one or more typical tasks as well as one or more unique tasks based upon information provided upon creation of the event. For example, one or more typical tasks might be generated for all or most events, and could include tasks such as acquiring a death certificate, filing a death certificate, acquiring a burial or cremation permit, hair & makeup, reserving a visitation venue, reserving a funeral venue, scheduling a disposition date and time, and other typical tasks. Unique tasks could include tasks based upon a specific religious belief or biographical information of the deceased. For example, unique tasks could include a rifle salute at the disposition when biographical information indicates military service or a priest delivering a religious service at the funeral when available information indicates a catholic faith. Other types of tasks generated will be apparent to one of ordinary skill in the art in light of this disclosure.

When event and task information is available, a Whiteboard may be rendered and displayed (610) via one or more user devices (1014, 1016, 1018) that is based on the event and task information. The Whiteboard may be displayed as one or more interfaces such as those shown in FIGS. 11-18. While the Whiteboard is being displayed, the Whiteboard service (1012) will regularly analyze external factors (612), receive updates (614), and prioritize tasks (616). When analyzing external factors (612) the Whiteboard service (1012) may receive information relating to one or more aspects of the event such as, for example, weather information indicating that rain will occur during the disposition, and may react accordingly by adding, removing, or modifying tasks as appropriate. For instance, if the Whiteboard service (1012) receives information indicating that rain will occur during an outdoor service at a cemetery, Whiteboard service (1012) may automatically push a request to the cemetery to set up a tent, provide umbrellas, and/or otherwise account for the rain conditions.

When receiving updates (614) the Whiteboard service (1012) may receive information from personnel relating to one or more aspects of the event, such as an indication that a task was completed or an indicating that a problem was encountered. When prioritizing tasks (616) the Whiteboard service (1012) may regularly examine incomplete tasks and then provide a visual indicator when time sensitive tasks remain incomplete despite the passage of time. When tasks are modified as a result of analyzing external factors (612), receiving task updates (614), or prioritizing tasks (616) the Whiteboard may be newly rendered and displayed (610) in order to reflect the modifications.

Figure 7:
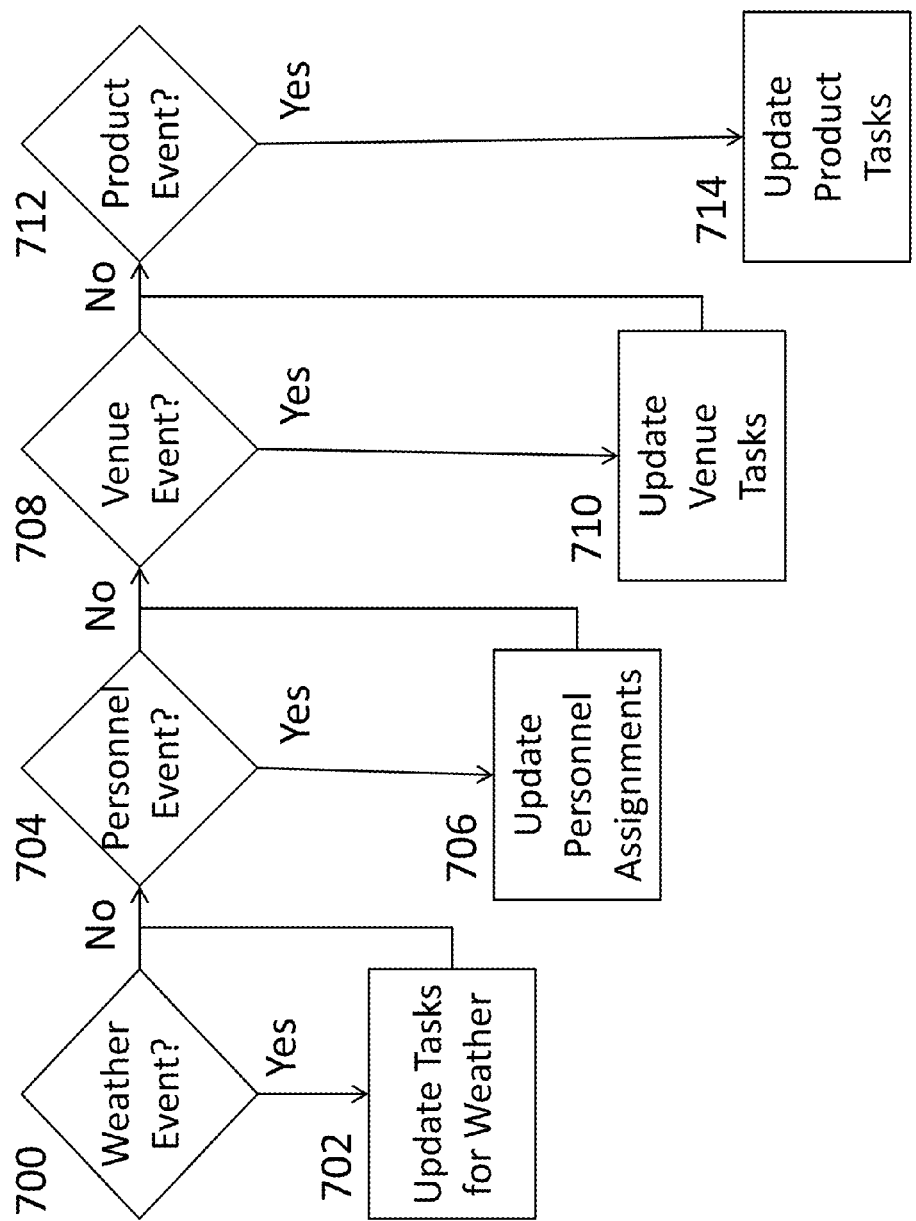
FIG. 7 is a flowchart of a set of exemplary steps that a system could perform to receive and react to external event information.

Turning now to FIG. 7, that figure shows a flowchart of a set of exemplary steps that a system could perform to receive and react to external event information. From time to time the Whiteboard service (1012) may receive external information that may necessitate a change to one or more tasks, or the creation or deletion of tasks. External information may arrive via one or more sources, such as weather tracking systems, personnel systems, third party venue systems, third party vendor systems, search engine alerts, or other sources. When an event is received, if it is a weather event (700) one or more tasks may be updated (702) to accommodate for the change in weather. As an example, if weather information indicates rain during a scheduled disposition (700) a task may be created (702) to indicate that a tent should be deployed at the disposition site to provide shelter from the rain. If a received event is a personnel event (704) one or more tasks may be updated to accommodate the change in personnel. For example, if a client personnel system indicates that an employee has left the client company or is unavailable due to illness (704) tasks that the employee was responsible for may be reassigned to other personnel (706).

If a received event is a venue event (708) one or more tasks may be updated to address the venue event (710). For example, if a venue system or search engine alert indicates that there is a problem with a venue (708), such as a fire that damaged the venue and made it unavailable, one or more tasks may be modified or created assigning personnel to check with the venue or reserve a new venue (710). If a received event is a product event (712) one or more tasks may be modified or created to accommodate the product event (714). For example, if an event is received from a vendor system indicating that an ordered concrete burial vault was damaged during transport (712), a task may be created assigning personnel to obtaining a replacement burial vault on short notice (714). Once the event has been processed by the system, the Whiteboard may be rendered and displayed (610) to reflect the resultant change. Received events could also include traffic events. For example, where an online traffic information provider indicates that there is construction, an accident, or perhaps a police investigation on a road that is part of a procession route, such information may be provided as an alert or event causing one or more tasks to be created requiring personnel to investigate the traffic issue and plan a new route if necessary. Received events could also include social media events. For example, social media sites such as Twitter or Facebook could be integrated with the whiteboard service (1012) so that funeral attendees could communicate indirectly with funeral home personnel through social media. As an example, the whiteboard service (1012) could monitor a Facebook event unique to a scheduled funeral, or could monitor twitter for a hashtag unique to a scheduled funeral, for various communications between attendees. In this manner, the whiteboard service (1012) could detect various events such as attendees running late, being unable to attend, traffic events, weather events, or other events that are commonly discussed on social media. Such alerts may be automatically interpreted based upon keyword identification and cause one or more tasks to be modified or created, or could be displayed on the white board device (1014, 1016, 1018) unedited so that they could be manually interpreted. Various other event types and behaviors exist and will be apparent in light of this disclosure.

Figure 8:
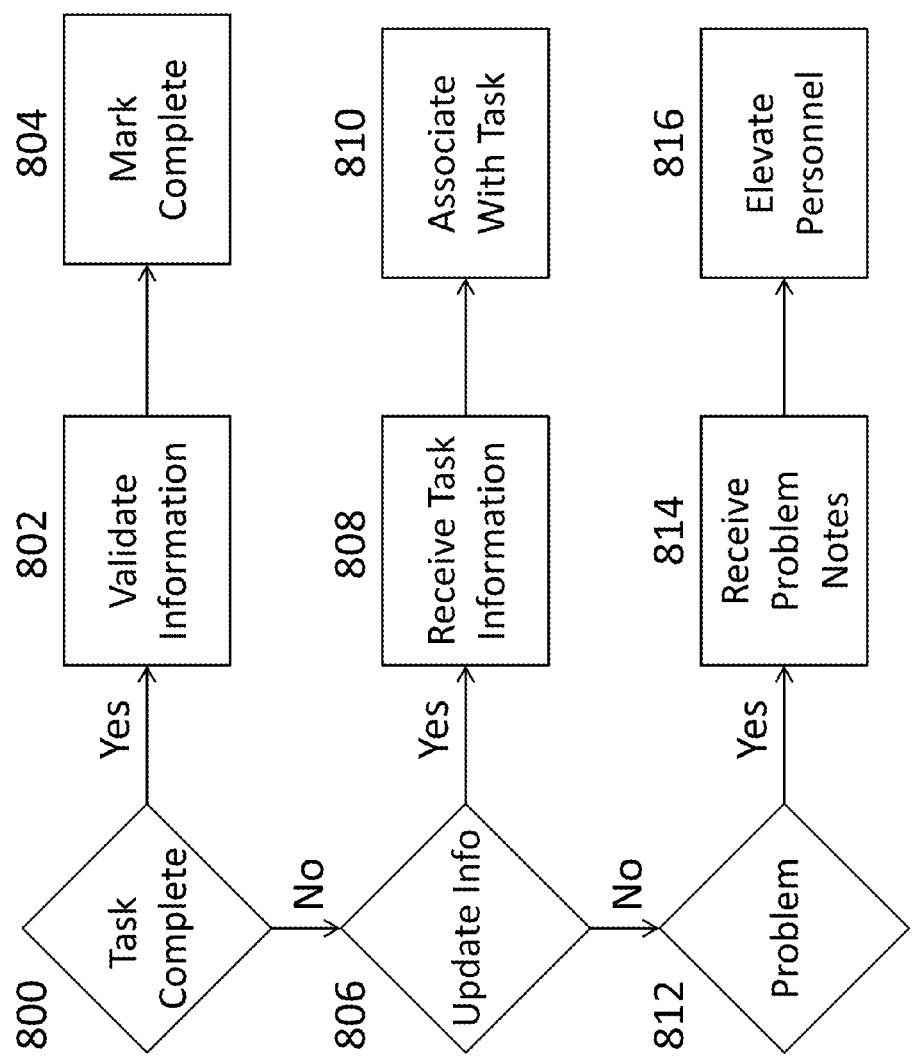
FIG. 8 is a flowchart of a set of exemplary steps that a system could perform to receive and react to task updates.

Turning now to FIG. 8, that figure shows a flowchart of a set of exemplary steps that a system could perform to receive and react to task updates. When a user completes a task or makes progress on a task, the user may submit one or more task updates via a user device (1014, 1016, 1018). If a received task update is that the task is complete (800) the Whiteboard service (1012) may validate the provided information (802) to ensure that all required information has been submitted before marking the task as complete (804). For example, if a task requiring that a visitation venue be reserved is marked as complete (800), the Whiteboard service (1012) may validate that a valid address and phone number has been provided for the visitation venue (802) before marking the task as complete (804) on the task completion list (1206). If a received task update is providing new information but not completing a task (806), the information will be received (808) and associated with the task (810). For example, if a task update is received (806) for a task requiring that a hairdresser be reserved, and the task update is that three different hairdressers have been contacted for the service but none have accepted (808), this information will be associated with the task (810) and may be viewable as a custom note (1302). If a received task update is that there is a problem with completing a task (812), notes relating to the problem will be received (814) and the task will be elevated to higher level personnel (816) that may be able to address the problem. For example, if a task problem is received (812) for a task requiring that a death certificate be acquired, and the received problem notes (814) indicate that a doctor has refused to issue a death certificate for some reason, the task may be assigned to the director or another supervisor (816) so that a person more familiar with overcoming unique issues that may arise can address the problem. Once the task has been updated to accommodate the received update, the Whiteboard may be rendered and displayed (610) to reflect the modified task.

Figure 9:
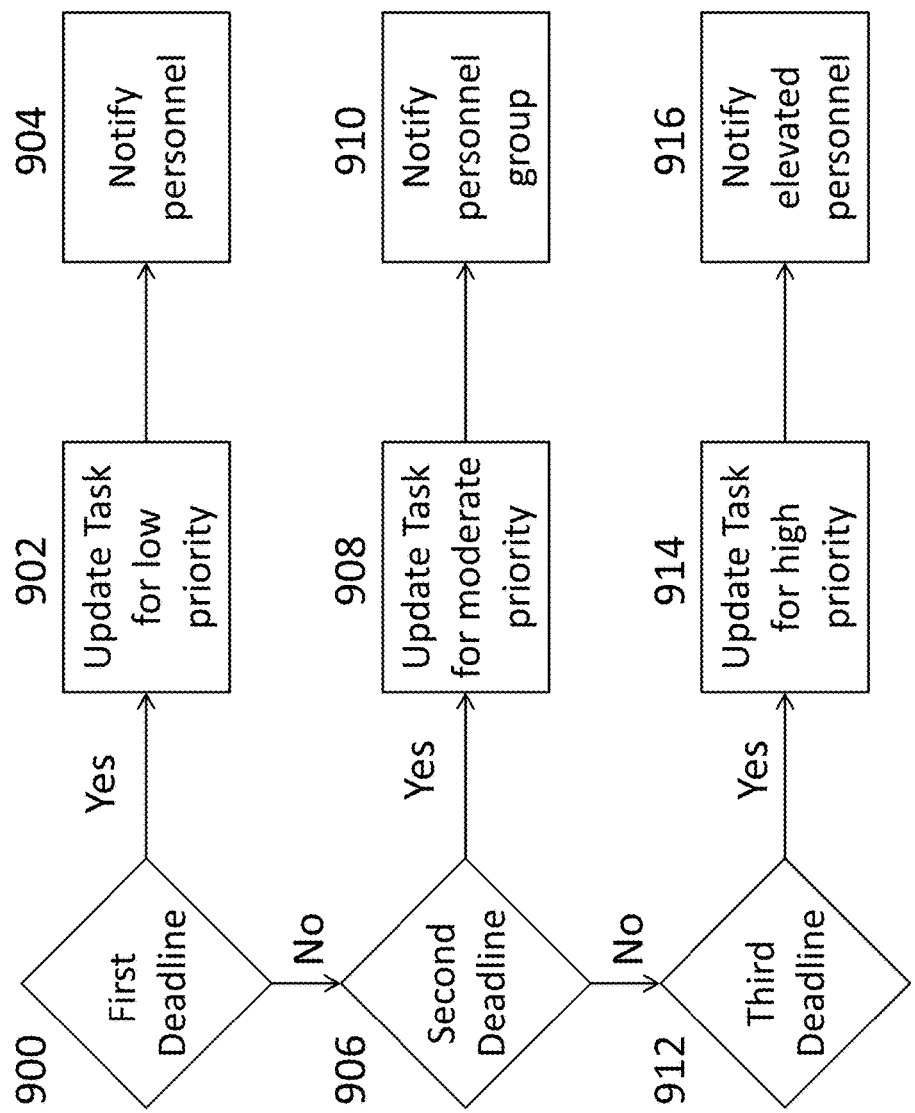
FIG. 9 is a flowchart of a set of exemplary steps that a system could perform to manage task priorities over time.

Turning now to FIG. 9, that figure shows a flowchart of a set of exemplary steps that a system could perform to manage task priorities over time. While displaying the Whiteboard, one or more tasks can be prioritized based upon a required completion date and one or more deadlines relative to the required completion date. Prioritization can be achieved by one or more of modifying the visual display of prioritized tasks, such as by changing the background color of a task, flashing the task, or other changes that would draw attention to the task, by generating audio alerts such as regular chimes or other alerts, or by generating direct communication to personnel responsible for tasks as well as their supervisors to provide a reminder of the time sensitivity of the tasks. Each task may have a different required completion date as well as different deadlines, based upon the nature and complexity of the task. For example, a task requiring that flowers be ordered might have a required date of completion twenty for hours before a scheduled visitation. Since the task of ordering flower is somewhat simple, a first deadline might be thirty six hours before the visitation, with a second deadline thirty hours before the visitation, and a third deadline twenty six hours before the visitation. For a more complex task, such as acquiring a burial or cremation permit, a required completion date might be the scheduled disposition date, with a first deadline forty eight hours before disposition, a second deadline thirty six hours before disposition, and a third deadline twenty four hours before disposition. The particular configuration of deadlines and required completion dates will vary based upon the particular task, with such variations being apparent in light of this disclosure.

While the Whiteboard is displaying tasks with configured deadlines, when a first deadline expires (900) for a task, the task will be updated to reflect a low priority (902) and responsible personnel may be notified (904) via one or more user devices (1014, 1016, 1018). Updating a task to represent low priority (902) might include, within an interface such as that shown in FIG. 12, displaying the task with a green background color, increasing the font size of the task slightly, or moving the task closer to the top of the list. Notification of responsible personnel (904) may include a text notification, automated phone call, or application notification being sent to the responsible personnel (1202). When a second deadline expires (906), the task may be updated to represent a moderate priority (908) and a personnel group rather than a single person may be notified (910). Updating a task for moderate priority (908) might include, within an interface such as that shown in FIG. 12, displaying the task with a yellow background color, increasing the font size, bolding the task description, or moving the task closer to the top of the list. Notification of a personnel group (910) might include notification, via a user device (1014, 1016, 1018), of one or more personnel associated with the event. When a third deadline expires (912), the task may be updated to represent a high priority (914) and personnel notifications may be further elevated (916). Updating a task to represent a high priority (914) might include, within an interface such as that shown in FIG. 12, displaying the task with a red background color, increasing the font size, causing the outline or background of the task to flash or blink, or moving the task to the top of the list. Elevation of notification to personnel (916) may include notifying an assigned director (1104) via a user device (1014, 1016, 1018). Once the task has been updated to accommodate changes in priority, the Whiteboard may be rendered and displayed (610) to reflect the modified task.

A practical example of how deadline based notifications and escalations may be implemented relates to preparation of the burial site, including digging of a hole for a burial vault, placement of chairs, flowers, walking surfaces, tents or other weatherproofing structures, and similar tasks. A miscommunication or misunderstanding between a funeral home and a cemetery could result in these tasks being incomplete, misplaced, or improperly performed on the day of a scheduled burial. With guests arriving and a burial vault being delivered for burial, this might cause an embarrassment and financial burden for the cemetery, as well as emotional suffering for the friends and family attending a burial ceremony that then must be delayed or canceled. In order to prevent these types of occurrences, the disclosed system could be configured with escalating deadlines for important tasks or events such as requesting that a burial site be prepared and receiving a confirmation that the burial site has been prepared.

For example, the system could be configured with a first deadline, relative to a scheduled burial day, of one week for requesting burial site preparation, a second deadline of 5 days, and a third deadline of 2 days, or 48 hours. A set of deadlines for confirming that the burial site has been prepared could be configured for 72 hours, 48 hours, and 24 hours. With this configuration, 7 days before a scheduled burial, a first deadline for requesting burial site preparation would be crossed (900) and the personnel responsible for the task would receive a notification (904). Then, 5 days before a scheduled burial, the second deadline would be crossed (906), and an escalated notification might be sent to a group of personnel responsible for the task (910). Finally, 48 hours before the scheduled burial (912), a final notification would be sent to an elevated personnel set (916). If at any point the system receives an update from a user that the task is complete, subsequent deadlines would not trigger notifications. In parallel, the system would additionally send out notifications (904, 910, 916) related to confirming that the burial site is prepared at 72, 48, and 24 hours before the scheduled burial. If at any point the system receives a confirmation from the burial site provider or cemetery that the site is complete, or if a user of the system submits an updated indicating that the burial site is complete, subsequent deadlines may not trigger notifications. Confirmation that is received from a burial site provider indicating that the burial site is prepared could include a simple text notification, an image of the prepared burial site, GPS coordinates indicating the location of the prepared burial site, and other information that a cemetery might provide to assure a funeral home that all required tasks have been completed.

Figure 19:
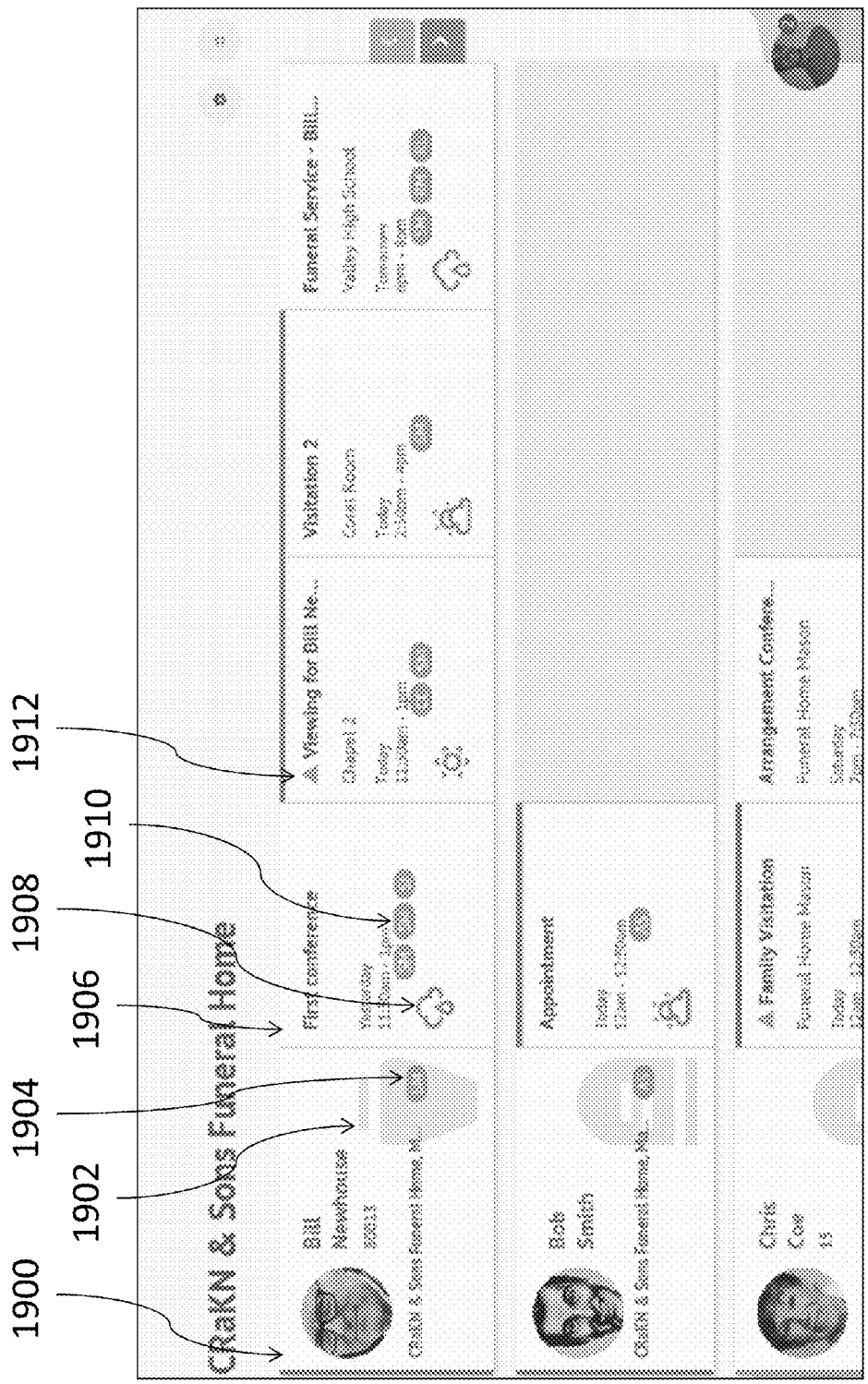
FIG. 19 is a screen capture showing an alternate interface for viewing and interacting with tasks and events related to death care.

While FIGS. 11-18 show various examples of interfaces that may be displayed to a user, user interfaces for the system may take other forms. For example, FIG. 19 shows one example of an exemplary interface that may be displayed to a user of the system via a whiteboard (1018) or other device. The interface shows one or more client rows (1900), with each client row having one or more associated client events (1906). A client row (1900) may be shown for each client for whom services are scheduled, and may contain information such as the client's name, a unique identifier, a funeral home associated with the client, a funeral director associated with the client (1904), and other icons, colors, or visual styles to indicate information about a client, such as a background image of an urn or tombstone to indicate a cremation or burial (1902). A number of client events (1906) may be created to describe one or more events associated with the client, such as various planning conferences with the family of the client, a public viewing, a family visitation, a funeral, or other events that may desirably be individually tracked. Client events (1906) may display information such as a description of the event, date and time of the event, an indication of weather (1908) during the planned time of the event, identifiers for personnel assigned to the event (1910), an indication that further information is needed before the event information is fully populated (1912), or other information. A client event (1906) may be clicked on by a user to expand the view and show additional information, such as custom notes or more verbose descriptions of information related to the event. As client events (1906) are created, they may queue within the client row (1900) in the order of the date associated with an individual event, in an order of priority or need for additional information, or by user configured or user specific filters or ordering schemes. The interface of FIG. 19 is a flexible interface for displaying client information, such that any number of client events can be created and will automatically populate the client row instead of fitting into concretely defined column headers. In this manner, a client could, for example, have two visitations scheduled, or have two funerals scheduled, to allow for public and private versions of each event to be managed by the system.

Figure 20:
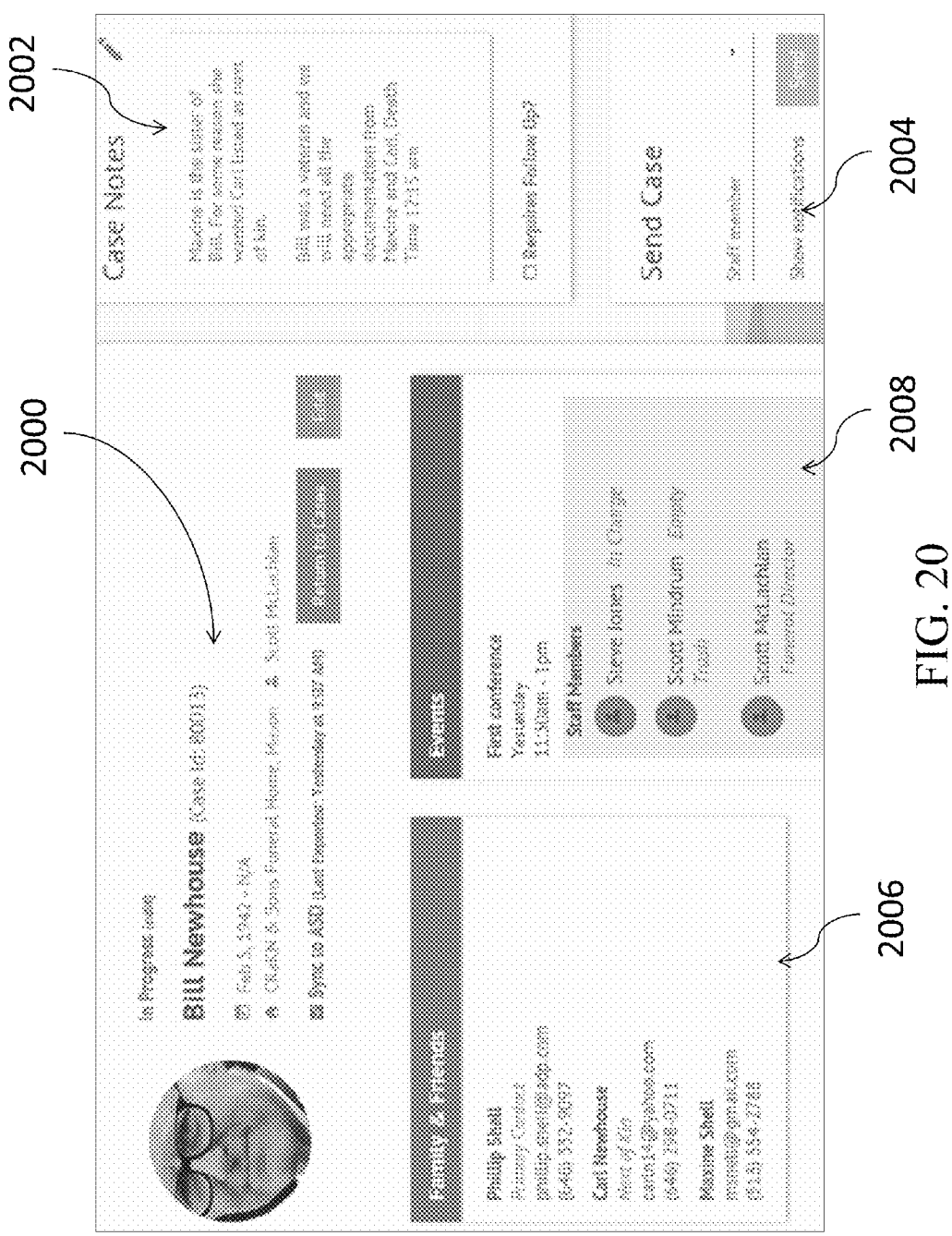
FIG. 20 is a screen capture showing an alternate interface for viewing and interacting with tasks and events related to death care.

FIG. 20 shows an interface that provides expanded information for a client row (1900) as well as additional controls related to the client and client events (1906), and may be reached by, for example, clicking or interacting with the client row (1900). Expanded client information (2000) may provide more verbose descriptions of information associated with the client, such as date of birth, date of death. A family and friends section (2006) may list the names and contact information of parties that have been involved in planning and coordination of services for the client. An events section (2008) may list information from one or more client events (1906) in an expanded format. A case notes section (2002) may be maintained and displayed to provide additional context that is not more appropriately entered into a client event (1906) due to having a more general impact on the client services. A notification section (2004) may provide additional tools to allow the client to be referred to another user of the system, or for certain client events (1906) to be referred to another user of the system, which may be useful where additional information or a correction of provided information is needed. The interface of FIG. 20 may be useful especially for a director assigned to a specific client row (1900), as it provides a more focused and isolated view and set of controls as opposed to the multi-client whiteboard view of FIG. 19.

Figure 21:
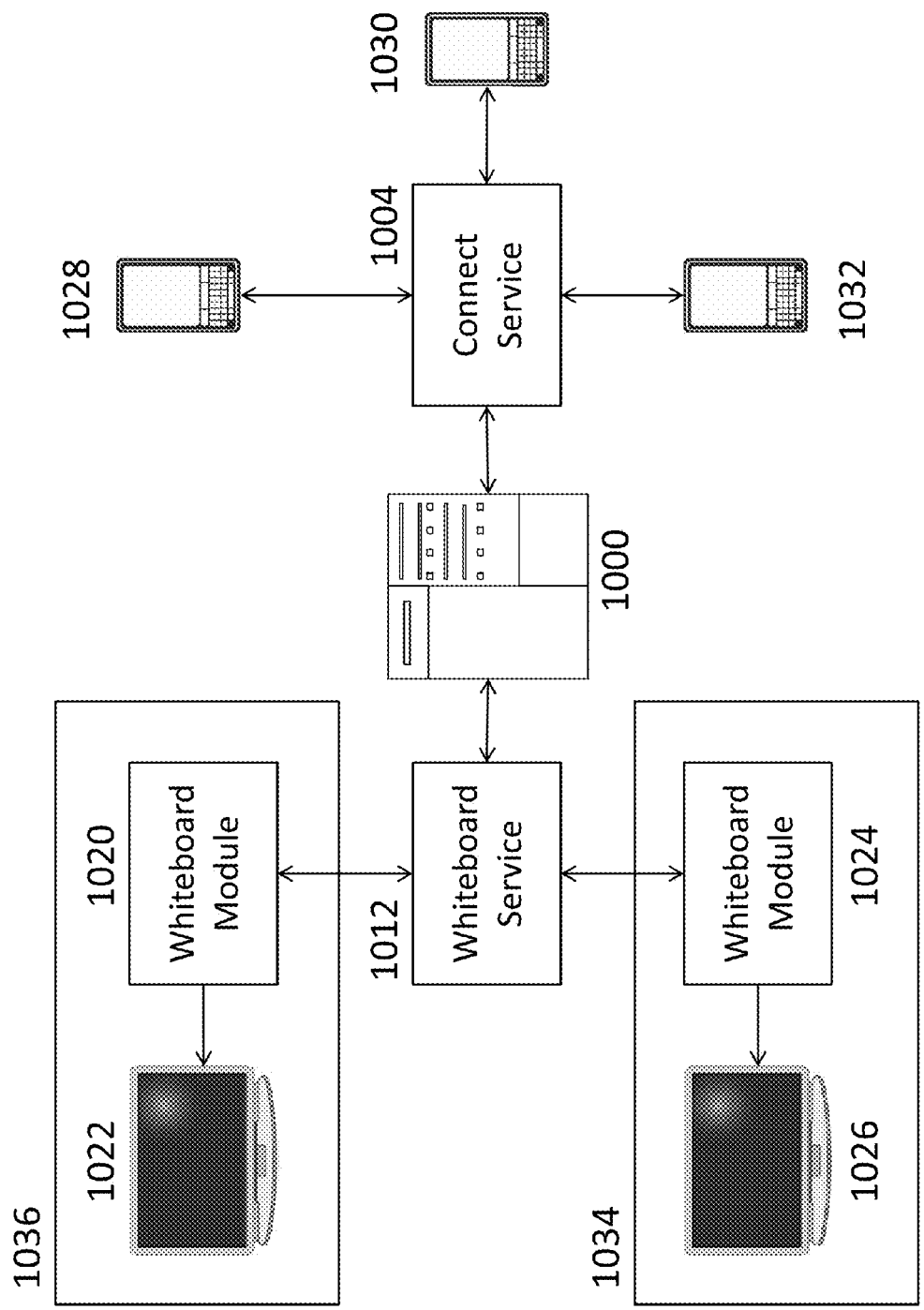
FIG. 21 is a schematic diagram of an alternate exemplary system configured to manage tasks and transactions related to death care.

While FIG. 10 shows one example of a system configured to provide management of tasks and transactions related to death care, other configurations may be used, such as that shown in FIG. 21. The configuration shown in FIG. 21 contemplates two entities that are primary users of the system and access it through the Whiteboard service (1012). These primary users may vary, but often will be a funeral home (1034) and a cemetery (1036). Primary users may subscribe to the Whiteboard service (1012) at varying levels of functionality and cost. While primary users (1034, 1036) may use the Whiteboard service (1012) in any of the manners previously described, they may additionally configure a whiteboard module (1020, 1024) to display the whiteboard interfaces to one or more whiteboard displays (1022, 1026). A whiteboard module may be a media hub, single board computer, or other dedicated purpose piece of equipment that receives information from the Whiteboard service (1012) and causes it to display on a whiteboard display (1022, 1026). A whiteboard display (1022, 1026) may be a flat screen television, computer monitor, projector display, or other device capable of receiving a video signal and displaying it to a user. In one merely exemplary version, a whiteboard module (1020, 1024) may be a single chip computer placed in a casing and configured to receive a hybrid web application display from the whiteboard service (1012) and output the received display via an HDMI connected flat panel television (1022, 1026). Such a configuration allows for users to have a low cost of entry and replacement with a minimal investment in proprietary hardware, while also providing a system administrator the ability to troubleshoot, push updates, and push configurations to whiteboard modules (1020, 1024) via the Whiteboard service (1012).

The system of FIG. 21 also allows for a number of secondary users to access the Connect Service (1004) via a secondary user device (1028, 1030, 1032) running an application or software. Secondary users may, in some embodiments, access and use the system at no cost or within a different fee arrangement than primary users (1034, 1036). Secondary users may be service providers that provide a single good or service to the client, most often through a primary user (1034, 1036), and may include burial vault providers, hair stylists, music performers, or similar services and goods. In the system of FIG. 21, when a funeral home (1034) creates client rows or client events that are associated with another primary user, such as a cemetery (1036), newly created client rows and events may be pushed, in whole or in part, via the Whiteboard service (1012) to the cemetery whiteboard display (1036). This allows for more near-immediate sharing of information for parties that are often working together under severe time constraints. Similarly, client events created by a funeral home (1034) that are associated with a secondary user may be pushed, in whole or in part, to the appropriate secondary user upon creation, via the connect service (1004) and an appropriately configured secondary user device (1028, 1030, 1032).

In some embodiments, each user has one or more user devices (1014, 1016, 1018) that are specifically configured for a single user, such that tasks assigned to that user are highlighted on their device and notifications intended for that user are deliver to their device. In other embodiments, a user device (1014, 1016, 1018) may be more generically configured, and may instead determine at the time of interaction the identity of the user. For example, where the user device is a mobile device (1016), the mobile device could display a general Whiteboard view until directly interacted with by a user. Upon interaction by a user, the mobile device (1016) could attempt to identify the user through radio frequency identification of a card or device carried by that user, or by facial recognition of a user via a front-mounted camera on the mobile device (1016). Similarly, a smart board device or display (1018) could identify users through radio frequency identification or facial recognition via an attached camera. Once identified, the Whiteboard display could be customized for that user such as by highlighting tasks assigned to that user or displaying notifications intended for that user.

While the primary users (1034, 1036) of FIG. 21 have been described as a cemetery and a funeral home, and the secondary users (1028, 1030, 1032) have been described as providers of services or goods such as hairdressers, tailors, burial vault providers, music providers, it should be understood that the classification as a primary user or secondary user is largely a function of scale, and that an organization that employees many hairdressers may in some cases be better suited to integrate with the system as a primary user (1036, 1034) with access to the whiteboard service (1012), which offers large volume service providers to integrate directly with data streams from cemeteries or funeral homes in addition to providing a descriptive interface for required tasks, instead of as a secondary user. For example, if a coroner or hospital in a small city only occasionally does work with a local cemetery or funeral home, operating as a secondary user through the connect service (1004) may be sufficient to meet the service provider's needs. However, in a large city, where a hospital or coroner is more likely to have a high volume of interaction with funeral homes and cemeteries, their needs may be better met by interfacing with the system as a primary user (1034, 1036).

In some embodiments, the Whiteboard service (1012) and Connect service (1004) may operate independently of each other as disclosed above. In other embodiments, the Whiteboard service (1012) may be in communication with the Connect service (1004) through the management server (1000) or via an API, web service, or other communication method. In one such embodiment, the Whiteboard service (1012) could provide communications originating from a Whiteboard user to the Connect service (1004), which could pass communications along to a vendor. The Connect service (1004) could provide communications originating from a vendor to the Whiteboard service (1012), which could display the communications to a client. In such an embodiment, a Whiteboard user responsible for a task (1200) could be provided with a selectable link associated with the task (1200) that would offer options for initiating a transaction with a vendor through the Whiteboard service (1012). For example, if a Whiteboard user was responsible for a task requiring that a hairdresser be scheduled, the task description could be selectable or could have an associated button that, when clicked, would cause a transaction to be received (106) by the Connect service for the services of a hairdresser. Similarly, a vendor confirmation (110) received by the Connect service (1004) could be communicated to the Whiteboard service (1012) and displayed via the task list (1200). When receiving automated task updates from the Connect service (1004) in this manner, the Whiteboard service (1012) could cause the time and date of confirmation to be logged (1204) and also mark the task as complete (1206) now that the hairdresser has been confirmed.

In yet another embodiment, when the Whiteboard service (1012) is analyzing external factors (612) the Connect service (1004) could provide event updates indicating that an issue has occurred with a venue (708) or product (712). In this manner, where a task has been marked as completed (1206), a vendor update (116, 118) indicating that a problem has occurred with a requested venue, service, or good could cause the task to be updated and marked as incomplete to indicate that further attention is needed. For example, if the Whiteboard service (1012) were to receive a vendor confirmation from a hairdresser, the task would be marked as completed (1206) and may not be given any further attention from assigned personnel. To continue the example, if the hairdresser were then to become unavailable and provide a vendor update (116, 118) indicating their unavailability, the Connect service (1004) could provide this update to the Whiteboard service (1012) as a product event (712) that would cause the product task to be updated (714) to reflect the fact that the task is no longer complete and another hairdresser must be reserved.

In yet another embodiment, the Whiteboard service could be configured to automatically perform a transaction and complete a task when, for example, the task reached a third priority deadline (912). In such an embodiment, where a Whiteboard user has configured certain preferred vendors, when a third deadline (912) passed rather than elevating the task to supervisory personnel (916), the Whiteboard service (1012) could instead communicate with the Connect service (1004) such that the service automatically receives a transaction (106) intended for the preferred vendor. In this manner, a simple task with little variety in the types of vendors that are used could be automatically performed by the Whiteboard service (1012) in communication with the Connect service (1004). For example, where a Whiteboard user only has one hairdresser whose services are used, if a task requiring that a hairdresser be reserved were to reach a third deadline (912) the Whiteboard service (1012) could generate a transaction to be received (106) by the Connect service (1004), which would notify the hairdresser and request confirmation (108).

In yet another embodiment, one or more of the user devices (1006,1010) interacting with the connect service (1004), or one or more of the user devices (1014, 1016, 1018) interacting with the whiteboard service (1012) may have voice or gesture capture functionality that can provide additional functionality. For example, a user device such as a mobile phone (1010) being used by a service provider such as an embalmer may have voice capture capabilities that would allow the embalmer to record voice memos that would be submitted to the system and provided to the client as a notification. In this example, an embalmer may have additional information to communicate to a funeral home other than a simple verification that the process has been completed. Such information could be provided by way of the voice memo, by way of text automatically transcribed from the voice memo, or by brief verifications based upon keywords or phrases parsed from a voice memo.

In yet another embodiment, one or more of the user devices (1006, 1010) interacting with the connect service (1004), or one or more of the user devices (1014, 1016, 1018) interacting with the whiteboard service (1012) may have integrated calendar functionality that is made accessible to the service (1004, 1012). When a device's integrated calendar is accessible to the connect services (1004), updates from vendors or clients may be automatically added to the calendars, providing information such as deadlines, locations, services, parties involved, and other information. Additionally, when a device's calendar is accessible to the whiteboard service (1012), personnel using the device may have tasks that they are responsible for automatically added to their device's calendar to provide various details relating to the task. When user calendars are available in this manner, calendars can be used to automatically asses a services provider's or funeral home personnel's availability before assigning a task or reserving a service. For example, if a funeral home personnel's device calendar reports that they are unavailable on a certain day, the whiteboard service (1012) may automatically assign or reassign tasks to other personnel who are available.

In yet another embodiment, the management server (1000) may track, compile, manipulate, and store in the database (1002) information that is received and sent by the connect service (1004) and whiteboard service (1012). Such data could include original, de-identified, and/or anonymized information relating to vendors, services, goods, clients, funeral homes, directors, personnel, events, notifications, updates, visitations, funerals, dispositions, tasks, and any other information that passes through the services (1004, 1012) or server (1000). Original data may be used to optimize the performance and functionality of the services (1004, 1012), while anonymized or de-identified data may be used to provide data to third parties to improve their own products, services, and methods. In such a way, parties relying on a particular service or good, such as the delivery of a concrete burial vault where time is of the essence, can view data that may lead them to procure the vault from a vendor outside a certain region due to a high number of delays occurring within that region. Other uses for both original and modified data will be apparent in light of this disclosure.

In some embodiments, the management server (1000) may be configured to execute one or more machine learning programs or artificial intelligence programs, such as a neural network, in order to analyze data stored in the database (1002) and develop the ability to predict certain events or occurrences over time. For example, a neural network may identify that a certain personnel at a funeral home often waits until the last minute to complete tasks, and may modify the default notification system in order to provide notifications for tasks 12 hours earlier than it does for personnel that are more timely. Over time, each input to the system, whether a traffic event, weather event, personnel specific event, client specific event, service provider specific event, or other information received by the system from a remote server or from a user of the system can be used to identify output events or responses. As another example, this could include identifying the occurrence of rain at certain cemeteries during certain months and automatically generating tasks for preparing tents or umbrellas in response. As another example, this could include identifying traffic problems resulting in delays for a funeral procession between a certain funeral home and a certain cemetery and automatically adjusting travel times and burial ceremony times in response. As another example, this could include identifying service providers who are consistently late in providing services, or who provide services that result in poor feedback from service receivers, and automatically pairing or suggesting different service providers. Other examples of reactive responses from a neural network will be apparent to one of ordinary skill in the art in light of the disclosure herein.

It should be understood that, while discussed largely in the context of the death care industry, many of the systems, methods, and technology innovations disclosed herein may be applied to other industries. The disclosed system is particularly suitable for industries with multi-party transactions, such as where there is a customer that is purchasing services and/or goods from a primary provider, where the primary provider obtains some or all of the goods and services from one or more secondary providers. One such example of another context might be automotive repair, where a customer takes a vehicle to a garage to have damage caused by a mechanical failure or accident repaired. In providing the repair services to the customer, the garage may need to interface with an insurance provider, a vehicle warranty provider, a parts provider, a detailing service, a painting service, a tire provider, and other such secondary providers. Similar examples can be found in building construction, contract renovation and repair work, hospitals and medical care providers, veterinary care providers, commercial landscaping, and other industries. Various suitable ways in which the teachings herein may be applied to these other industry contexts will be apparent to those of ordinary skill in the art in view of the teachings herein.

Further variations on, features for, and applications of the inventors' technology will be apparent to, and could be practiced without undue experimentation by, those of ordinary skill in the art in light of this disclosure. Accordingly, the protection accorded by this document, or by any related document, should not be limited to the material explicitly disclosed herein.

What is claimed is:

1. A system for managing events related to death care comprising:
   (a) a server communicatively coupled with a database; and
   (b) a client device comprising a display and a user input, wherein the client device is communicatively coupled with the server;
   wherein the server is configured to:
   (i) receive a set of decedent information from the client device, the set of decedent information describing a decedent and a memorial event,
   (ii) create a decedent entry in the database, the decedent entry comprising a set of decedent events, based upon the decedent information, wherein the set of decedent events are determined automatically based upon the memorial event, and wherein the set of decedent events each must be performed prior to the memorial event,
   (iii) send a set of whiteboard data to the client device, the set of whiteboard data configured to cause the client device to display a whiteboard interface, the whiteboard interface comprising a graphical display of the set of decedent entries,
   (iv) receive a service request associated with a decedent event from the client device via the whiteboard interface and convert the service request into an electronic text message for transmission to a service provider,
   (v) provide the electronic text message to the service provider via an electronic text message channel, receive a service response, and update the decedent event based upon the service response, wherein the electronic text message comprises one or more defined responses configured to be selected by the service provider and returned as the service response via the electronic text message channel,
   (vi) when the service request is for delivery of a burial vault, receive a unique identifier and a present location of a service provider device from the service provider device via the electronic text message channel, wherein the unique identifier is received by the service provider device from a unique electronic identifier placed on the burial vault, and update the decedent event in the database to associate the unique identifier and the present location of the service provider device with the decedent event, and
   (vii) cause the whiteboard interface to display the location of the burial vault based on the present location of the service provider device.

2. The system of claim 1, wherein the server is configured to convert, as the service request, requests for at least one of:
   (i) creation of a burial vault,
   (ii) delivery of a burial vault,
   (iii) makeup services,
   (iv) hair services, or
   (v) embalming services; and
   wherein the electronic text message channel is selected from the group consisting of:
   (i) an email, and
   (ii) a text message.

3. The system of claim 1, further comprising a plurality of service provider devices, the plurality of service provider devices including the service provider device, each service provider device comprising a location sensor operable to determine the present location of that service provider device, wherein the server is further configured to:
   (i) receive the present location of the service provider device from the location sensor via the electronic text message channel,
   (ii) determine, based upon the present location, that the service provider device is proximate to a service location associated with a service request that is associated with that service provider device, and
   (iii) update the decedent event in the database to indicate that the service request that is associated with that service provider device is underway.

4. The system of claim 1, wherein the server is further configured to:
   (i) generate a request for information associated with the service request, and automatically provide the request for information to the service provider a number of hours prior to expected completion of the service request, wherein the number of hours are based on a type of the service request,
   (ii) receive an indication from the service provider in response to the request for information that performance of a service associated with the service request has begun, and
   (iii) update the decedent event to indicate that performance of the service has begun.

5. The system of claim 1, wherein the client device is further configured to display each decedent event of the set of decedent events proximate to a weather forecast associated with the date, time, and location of the decedent event, and wherein the server is further configured to:
(a) identify a decedent event that is associated with an impacting weather forecast,
(b) automatically generate a new decedent event based upon the type of the decedent event and the type of the impacting weather forecast, and
(c) add the new decedent event to the set of decedent events for the memorial event,
wherein the new decedent event is configured to, when performed, mitigate the impact of a weather event associated with the impacting weather forecast on the decedent event.

6. The system of claim 1, wherein the client device comprises one or more of:
(i) a smart phone,
(ii) a computer, or
(iii) a video display.

7. The system of claim 1, wherein the server is further configured to:
(a) receive a set of attendees associated with the memorial event,
(b) provide an invitation to each of the set of attendees, wherein the invitation comprises a set of instructions for discussing the memorial event on a social media site,
(c) receive a memorial event comment from an attendee of the set of attendees via the social media site,
(d) identify a keyword within the memorial event comment and create a new decedent event based upon the keyword, and
(e) add the new decedent event to the set of decedent events for the memorial event.

8. The system of claim 1, wherein the server is further configured to:
(a) identify a decedent event that is associated with a traffic event, and
(b) automatically modify the decedent event based upon the type of the decedent event and the type of the traffic event,
wherein the decedent event is modified to mitigate the impact of the traffic event on the decedent event.

9. A method for managing events related to death care comprising the steps:
(a) receiving, at a server, a set of decedent information from a client device, the set of decedent information describing a decedent and a memorial event;
(b) creating in a database a decedent entry, the decedent entry comprising a set of decedent events, based upon the decedent information, wherein the set of decedent events are determined automatically based upon the memorial event, and wherein the set of decedent events each must be performed prior to the memorial event;
(c) sending a set of whiteboard data to the client device, the set of whiteboard data configured to cause the client device to-display a whiteboard interface, the whiteboard interface comprising a graphical display of the set of decedent entries;
(d) receiving a service request associated with a decedent event from the client device via the whiteboard interface and converting the service request into an encoded request for transmission to a service provider as an electronic text message for transmission to a service provider;
(e) providing the electronic text message to the service provider via an electronic text message channel, receiving a service response, and updating the decedent event based upon the service response wherein the electronic text message comprises one or more defined responses configured to be selected by the service provider and returned as the service response via the electronic text message channel;
(f) receiving a present location of a service provider device of a plurality of service provider devices from the service provider device, via the electronic text message channel;
(g) determining, based upon the present location from the service provider device, that the service provider device is proximate to a service location associated with a service request that is associated with that service provider device;
(h) updating the decedent event in the database to indicate that the service request that is associated with that service provider device is underway; and
(i) causing the client device to refresh the whiteboard interface and display the updated decedent event from the database.

10. The method of claim 9, further comprising the steps:
(a) generating a request for information associated with the service request, and automatically providing the request for information to the service provider a number of hours prior to expected completion of the service request, wherein the number of hours are based on a type of the service request;
(b) receiving an indication from the service provider in response to the request for information that performance of a service associated with the service request has begun; and
(c) updating the decedent event to indicate that performance of the service has begun.

11. The method of claim 9, wherein the service request is for delivery of a burial vault, wherein a unique electronic identifier is placed on the burial vault and is operable to receive a unique identifier, further comprising the steps:
(a) receiving the unique identifier from the service provider device via the electronic text message channel;
(b) associating the unique identifier with the decedent event; and
(c) updating the decedent event to indicate the location of the burial vault as the present location of the service provider device.

12. The method of claim 9, further comprising the steps:
(a) in response to the decedent event being incomplete past a first threshold date, sending a notification to one or more personnel associated with the decedent event; and
(b) in response to the decedent event being incomplete past a second threshold date, sending a notification to a director associated with the decedent entry.

13. The method of claim 9, further comprising the step displaying each decedent event of the set of decedent events proximate to a weather forecast associated with the date, time and location of the decedent event, further comprising the steps:
(a) identifying a decedent event that is associated with an impacting weather forecast;
(b) automatically generating a new decedent event based upon the type of the decedent event and the type of the impacting weather forecast; and
(c) adding the new decedent event to the set of decedent events for the memorial event;

wherein the new decedent event is configured to, when performed, mitigate the impact of a weather event associated with the impacting weather forecast on the decedent event.

14. The method of claim 9, further comprising the steps:
(a) at the server, determining a subset of the set of whiteboard data, the subset of the set of whiteboard data comprising only the decedent entries and the decedent events that are associated with a personnel that is associated with a personnel device;
(b) sending the subset of the set whiteboard data to the personnel device; and
(c) at the personnel device, displaying a personnel specific whiteboard interface, the personnel specific whiteboard interface comprising a graphical display of the subset of the set of whiteboard data.

15. The method of claim 9, further comprising the steps:
(a) displaying each decedent event of the set of decedent events proximate to a set of traffic information for roadways associated with the location of the decedent event;
(b) identifying a decedent event that is associated with a traffic event; and
(c) automatically modifying the decedent event that is associated with the traffic event based upon the type of the decedent event and the type of the traffic event;
wherein the decedent event is modified to mitigate the impact of the traffic event on the decedent event.

16. The method of claim 9, further comprising the step receiving the present location of the service provider device from a location sensor of the service provider device.

17. The method of claim 9, further comprising the steps:
(a) receiving a user input via the whiteboard interface, the user input selecting the decedent entry; and
(b) in response, causing the whiteboard interface to display a plurality of decedent events associated with the decedent entry.

* * * * *